United States Patent
Ruelke et al.

(10) Patent No.: US 8,331,865 B2
(45) Date of Patent: Dec. 11, 2012

(54) HIGH SPEED MINIMAL INTERFERENCE ADAPTIVE TRANCEIVER INTERFACE AND METHOD THEREOF

(75) Inventors: Charles R. Ruelke, Margate, FL (US); Raul Salvi, Boca Raton, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 281 days.

(21) Appl. No.: 12/620,933

(22) Filed: Nov. 18, 2009

(65) Prior Publication Data

US 2011/0117854 A1     May 19, 2011

(51) Int. Cl.
*H04B 1/00*     (2006.01)
*H04B 1/38*     (2006.01)
*H04M 1/00*     (2006.01)

(52) U.S. Cl. ...... 455/63.1; 455/73; 455/550.1; 375/148; 375/220; 375/285; 370/338; 370/442

(58) Field of Classification Search ............. 455/63.173, 455/550.1; 375/148, 220, 285; 370/338, 370/442
See application file for complete search history.

(56) References Cited

U.S. PATENT DOCUMENTS

| | | | |
|---|---|---|---|
| 6,374,361 B1 | 4/2002 | Lee | |
| 6,963,554 B1 * | 11/2005 | Weigand | 370/347 |
| 7,030,656 B2 | 4/2006 | Lo | |
| 7,315,185 B2 | 1/2008 | Yu | |
| 7,449,886 B2 | 11/2008 | Buchwald | |
| 7,508,750 B2 | 3/2009 | Cleveland | |
| 7,509,138 B2 | 3/2009 | Shin | |
| 7,512,191 B2 | 3/2009 | Laamanen | |
| 7,515,629 B2 | 4/2009 | Tonietto | |
| 7,515,646 B2 | 4/2009 | Hardin | |
| 7,729,722 B2 * | 6/2010 | Rofougaran et al. | 455/550.1 |
| 7,881,746 B2 * | 2/2011 | Desai | 455/552.1 |
| 7,900,047 B2 * | 3/2011 | Lyle | 713/171 |
| 2003/0227303 A1 | 12/2003 | Ilchmann | |
| 2004/0150721 A1 | 8/2004 | Matsuda | |
| 2006/0002483 A1 | 1/2006 | Kim | |
| 2006/0267634 A1 | 11/2006 | Koo | |
| 2009/0325625 A1 * | 12/2009 | Hugl et al. | 455/522 |
| 2010/0075704 A1 * | 3/2010 | Mchenry et al. | 455/509 |

OTHER PUBLICATIONS

Ito, et al. "A Low-Latency and High-Power-Efficient On-Chip LVDS Transmission Line Interconnect for an RC Interconnect Alternative"; International Interconnect Technology Conference, IEEE 2007, Jun. 4-6, 2007.

(Continued)

*Primary Examiner* — Andrew Wendell
*Assistant Examiner* — Chung-Tien Yang
(74) *Attorney, Agent, or Firm* — Anthony P. Curtis; Daniel R. Bestor

(57) ABSTRACT

A method for minimizing undesired signal coupling from digital interface between peripherals is presented. The method includes transmitting over the interface first and second signals having a parameter $\zeta_k$ set by a dynamic sequencer respectively to a first and second value $\alpha_1$ and $\alpha_2$, receiving the first and second signal and generating a first and second interference metric respectively for the first and second signal. The first and second interference metrics are correlated to generate a final parameter value $\alpha_f$, and a transmitter is then configured to transmit a third signal over the interface with the final parameter value $\alpha_f$.

21 Claims, 5 Drawing Sheets

OTHER PUBLICATIONS

Tajalli, et al. "A Slew Controlled LVDS Output Driver Circuit in 0.18 µm CMOS Technology"; IEEE Journal of Solid-State Circuits, vol. 44, No. 2, Feb. 2009.

Chen, et al. "Low-Voltage Low-Power LVDS Drivers"; IEEE Journal of Solid-State Circuits, vol. 40, No. 2, Feb. 2005.

Boni, et al. "LVDS I/O Interface for GB/S-Per-Pin Operation in 0.35-µm CMOS"; IEEE Journal of Solid-State Circuits, vol. 36, No. 4, Apr. 2001.

Draft MIPI Alliance Specification for digRFSMv4; Version 0.64.00 4—Sep. 2008.

* cited by examiner

HIGH SPEED MINIMAL INTERFERENCE ADAPTIVE TRANCEIVER INTERFACE AND METHOD THEREOF

FIELD OF THE INVENTION

The present invention relates to a transceiver interface and a method of operation and optimization of the transceiver interface. In particular, the invention relates to minimizing interference associated with a Low Voltage Differential Signaling (LVDS) interface by adaptively iterating critical LVDS parameters $\zeta_k$ synchronous with concurrent transceiver system operations to optimize the LVDS interface performance.

BACKGROUND

As the radio frequency (RF) transceiver-to-digital interface clock speeds approach multiples of hundreds or even multiples of thousands of megahertz (MHz), the risk of spurious and/or other correlated noise interference coupling into low noise RF analog circuits from digital signal sources often becomes pronounced. Accordingly, a digital interface configuration may be optimized for a particular protocol while mitigating ancillary spurious coupling or other undesired responses by adjusting certain interface parameters, which may include, but are not limited to clock speed, data rate, signal drive level, clock slew rate, termination impedance, or ringing characteristics.

Furthermore, with the advent of software definable radio (SDR) wireless devices, support of wideband and broadband protocols having channel spacing from 1 MHz to 50 MHz is desired, coupled with being operationally compatible with narrow band mission critical protocols having channel spacing from 6.25 kHz up to 1 MHz. A digital interface configuration suitable for broad band applications should support high data rates (e.g. multiple tens of MHz), which may impose significant power consumption penalties and generate unacceptable noise coupling mechanisms for narrower channel spacing protocols such as Association of Public-Safety Communications Officials (APCO) and legacy FM distributed communication systems. However, a digital interface optimized for lower data rates associated with narrow band protocols may not afford sufficient bandwidth and buffer drive capability to operate at high data rates satisfactory for broadband applications. These divergent protocol requirements precipitate the need for a scalable, minimum noise, high speed digital interface between RF devices incorporating low noise analog systems, such as a RF modem, and host or digital signal processor (DSP) controllers.

In addition, a scalable digital interface may facilitate optimized partitioning of integrated circuits (ICs) for lowest cost. Bulk Complementary Metal Oxide Semiconductor (CMOS) IC processes are a low cost technology for digital logic structures used in processor or digital state machines. However, the CMOS transistor noise characteristics typically prevent their inclusion in low noise analog circuit design. While traditional Bipolar-CMOS (BiCMOS) processes typically incorporate transistor structures ideally suited for small signal low noise analog circuit designs, the BiCMOS cost per unit area is usually significantly higher than the cost per unit area of CMOS. Therefore, an adaptively scalable digital interface strategy may facilitate IC partitioning between RF and DSP integrated circuits such that each integrated circuit can have the most appropriate and least costly technology.

It is therefore desirable to have a scalable, high speed transceiver-to-digital interface that can be adaptively optimized for protocol specific requirements while simultaneously mitigating spurious interference and noise coupling into sensitive, small signal, low noise analog systems.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts, and explain various principles and advantages of those embodiments.

Figure 1:
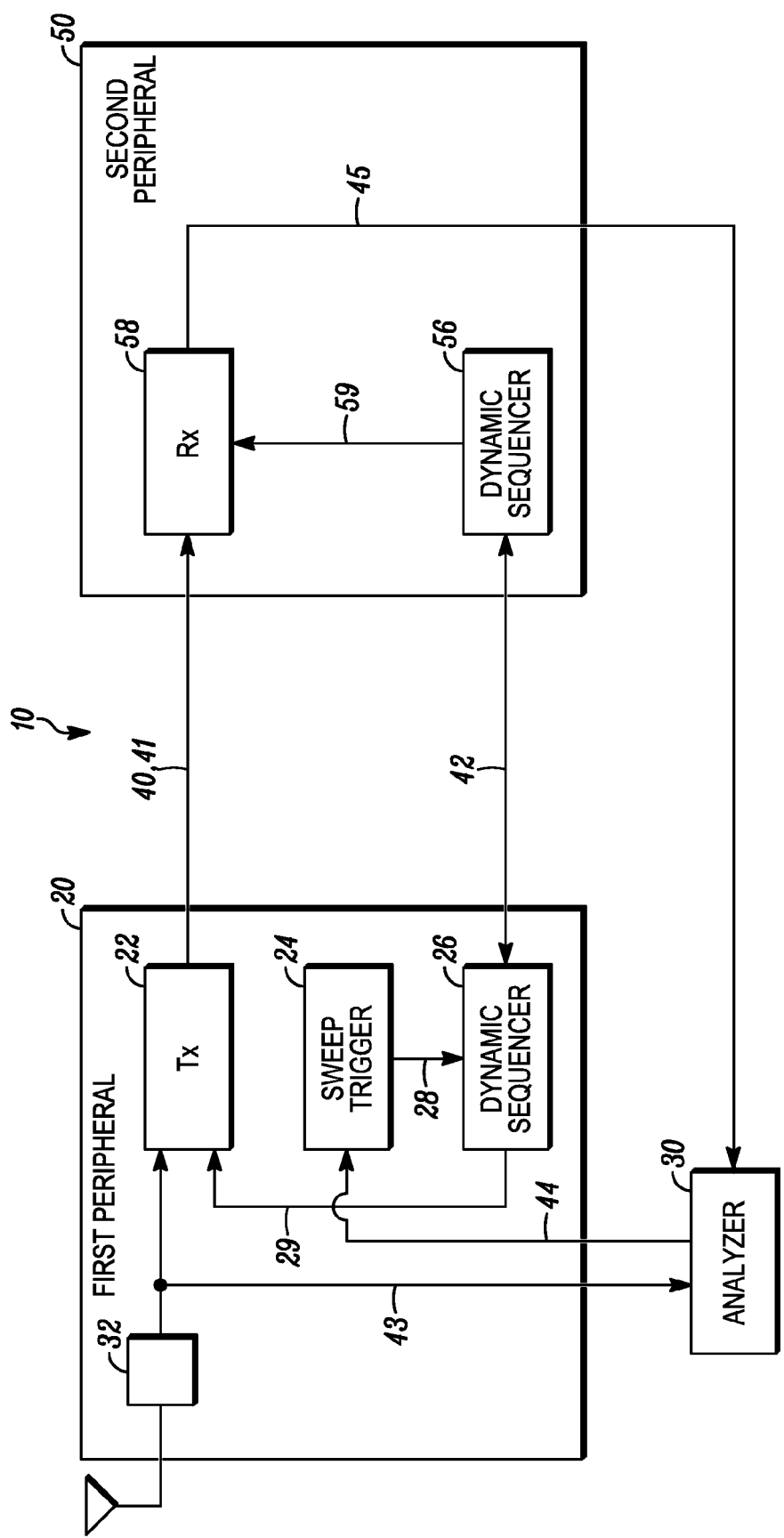
FIG. 1 depicts one embodiment of a block schematic diagram of an adaptively scalable digital interface that may be optimized for minimal spurious response or correlated noise coupling.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

By using a low voltage differential signaling (LVDS) interface with adjustable parameters, and by coupling the LVDS interface to a dynamic sequencer, an adaptive LVDS interface is formed which may be optimized to operate with a reduced amount of spurious interference and correlated noise emissions while still maintaining interface signal fidelity.

FIG. 1 depicts one embodiment of a block schematic diagram of a high speed minimal interference unidirectional adaptive transceiver interface 10. The adaptive transceiver interface 10 is a communications interface which is formed between at least two peripheral devices, a first peripheral device 20 and a second peripheral device 50, and includes a first interface 40 from the first peripheral device 20 to the second peripheral device 50, and a second interface 42 between the second peripheral device 50 to the first peripheral device 20. Digital signals 41 are transmitted by a transmitter 22 along the first interface 40 to a receiver 58. Transmitter 22 may be embedded in first peripheral device 20 and receiver 58 may be embedded in the second peripheral device 50. In addition, a receiver (not shown in FIG. 1) may also be embedded in first peripheral device 20 and a transmitter (not shown in FIG. 1) may be embedded in second peripheral device 50 interconnected by a second connection. The adaptive transceiver interface 10 allows for digital signals 41 to be transmitted and received between the first and second peripheral devices 20, 50. Preferably, the adaptive transceiver interface 10 transmits digital signals 41 at a transmission rate dictated by the information transfer requirement specific to an application. For example, a narrow band wireless communication system may use a transmission rate for digital signal 41 of ten or more MHz; however broadband, high speed applications may use transmission rates for digital signal 41 of a frequency of one hundred or thousands or more MHz. First and second peripheral devices 20, 50 may be any devices which send and receive digital signals, such as: integrated circuits including DSP, memory chips, transmitters, receivers, transceivers; cameras; printers; computers; fiber optic modems, telephones; cars; televisions; and storage devices such as CD-ROM, hard disk drives, and memory. Preferably, the first peripheral device 20 device includes or is connected with a wireless transceiver 32.

The first interface 40 connects the first peripheral device 20 with the second peripheral device 50 and allows for digital signals 41 to be transmitted from the first peripheral device 20 to the second peripheral device 50. The digital signals 41 transmitted on first interface 40 originate from transmitter 22 and are received by receiver 58, wherein the physical connection between a transmit-receive pair, 22, 58 respectively, may be a wired interface. The transmit-receive pair 22, 58 connected by first interface 40 form of a unidirectional adaptive transceiver interface which allows for electronic signals to pass in one direction from the first peripheral device 20 to the second peripheral device 50. The physical interface comprising first interface 40 permits low voltage differential signals (LVDS) to pass through and is therefore referred to as a LVDS interface. A second transmit-receiver pair (not shown in FIG. 1) can be configured between the first peripheral device 20 and the second peripheral device 50 to allow for digital signals to be transmitted from the second peripheral device 50 to the first peripheral device 20. To support this configuration, a second transmit-receive pair would be positioned such that the transmitter is located in the second peripheral device 50, and the companion receiver would be located in the first peripheral device 20. The second transmit-receive pair would facilitate LVDS to be communicated from the second peripheral device 50 to the first peripheral device 20. A first transmit-receive pair 22, 58 connected by a first interface 40 that communicate from a first to a second peripheral device, taken together with a second transmit-receive pair and a second associated interface that communicate from the second peripheral to the first peripheral device, form part of a bi-directional adaptive transceiver interface.

By further extension, any number of transmit-receive pairs connected by a low voltage differential signal connections can be incorporated into the first and second peripheral devices 20, 50 to interconnect any desired number of additional peripherals, each being able to communicate digital signals from a transmitter to a receiver as supported by the particular interface configuration. A plurality of transmit-receive pairs can be combined to form any number of particular wired interfaces including, but not limited to: USB, RS-422, RS-485, Ethernet, PCI Express, IEEE-488, Serial Port Interface (SPI), or other serial data interfaces, and parallel data interfaces.

The adaptive transceiver interface 10 includes a transmit-receive pair composed of transmitter 22 and receiver 58, a sweep trigger 24, a dynamic sequencer 26 conjoined to transmitter 22, a dynamic sequencer 56 conjoined to receiver 58, and an analyzer 30. As illustrated in FIG. 1, transmit-receive pair 22, 58 communicate digital signals 41 over first interface 40. Sweep trigger 24 is connected to dynamic sequencer 26 to receive a trigger signal 28, and dynamic sequencer 26 is connected to transmitter 22 and communicates a dynamic sequencer signal 29. In addition, dynamic sequencer 26 communicates to dynamic sequencer 56 via a second interface 42, which may be a digital link, whereby dynamic sequencers 26 and 56 are able to coordinate adaptive configuration of the transmit-receive pair 22, 58. Preferably, the transmitter 22, the sweep trigger 24, and the dynamic sequencer 26, are incorporated in the first peripheral device 20, as shown in FIG. 1. First peripheral device 20 may also include transceiver 32, where transceiver 32 may incorporate an associated wireless transmitter and/or wireless receiver. Transceiver 32 will be described in greater detail in FIG. 2. Referring to FIG. 1, transmitter 22 takes information, preferably digital information, from transceiver 32 that is to be communicated to second peripheral device 50 over the adaptive transceiver interface 10. Analyzer 30 may be included in first peripheral device 20 or second peripheral device 50, as may be convenient for signal analysis of transceiver interface 10.

Transmitter 22 transmits signals 41 which are received by the second peripheral device 50 via the first interface 40. While transmitter 22 preferably transmits differential signals via the first interface 40, it may transmit other types of signals, including single-ended signals. Differential signals communicate information electrically by means of using two complementary signals sent on two separate wires. Complementary signals are defined as two signals that are transmitted over two separate wires where the phase of the second signal is offset by 180 degrees from the phase of the first signal. Transmitter 22 may transmit signals 41 at a variety of voltages. Preferably, the transmitter 22 transmits a low voltage differential signal at peak offset voltage levels of about five volts or less. In one embodiment, the transmitter 22 is an LVDS transmitter which transmits differential signals at low voltage for communicating formatted sampled data. The formatted sample data preferably contains a binary representation of the formatted sampled data, a sample clock signal, and a sample framing designator.

The operational characteristic of transmitter 22 may be set by parameters $\zeta_T$, which in turn may be adjusted to support various protocols and interface fidelity requirements while optimizing transmitter 22 for reduced spurious responses and correlated noise coupling. Parameters $\zeta_T$ that may be adjusted by the dynamic sequencer 26 may include, but are not limited to, slew rates, sample rate, clock rates, duty cycles, differential phase offset, common mode voltage offsets, termination impedance, current or voltage mode operation, and differential or single-ended amplitude levels.

Receiver 58 incorporated in the second peripheral device 50 receives signals 41 which are transmitted by transmitter 22 via the first interface 40. Preferably, receiver 58 receives differential signals via the first interface 40; however the receiver 58 may receive other types of signals, including single-ended signals. Receiver 58 may receive signals 41 at a variety of voltages. Preferably, the receiver 58 receives low voltage differential signals which are transmitted at peak offset voltage levels of about five volts or less. In one embodiment, the receiver 58 is a LVDS receiver which receives differential signals at low voltage for communicating formatted sampled data. The formatted sample data preferably contains a binary representation of the formatted sampled data, a sample clock signal, and a sample framing designator.

The operational characteristic of receiver 58 may be set by parameters $\zeta_R$, which in turn may be adjusted to support various protocols and interface fidelity requirements while optimizing the receiver 58 for reduced spurious responses and correlated noise coupling. Parameters $\zeta_R$ that may be adjusted by dynamic sequencer 56 may include, but are not limited to, slew rates, sample rate, clock rates, duty cycles, differential phase offset, common mode voltage offsets, termination impedance, current or voltage mode operation, and differential or single-ended amplitude levels.

Transmitter 22 and receiver 58 form a transmit-receive pair 22, 58 that communicate along first interface 40. Transmit-receive pair 22, 58, together with conjoined dynamic sequencers 26 and 56, sweep trigger 24 and interfaces 40 and 42 form the adaptive transceiver interface 10. The adaptive transceiver interface 10, in conjunction with analyzer 30, may be utilized to optimize the first interface 40 for optimum signal fidelity by minimizing spurious responses or other correlated noise interference mechanisms. First interface 40 may be optimized by synchronously adjusting transmit parameters $\zeta_T$ and receive parameters $\zeta_R$ sequentially through a plurality of predetermined transmitter and receiver values $\alpha_T$ and $\alpha_R$ respectively, while measuring the correlated noise responses at analyzer 30 for each value combination $\alpha_T$ and $\alpha_R$. From the interference results, a final transmit parameter value $\alpha_{Tf}$ and receive parameter value $\alpha_{Rf}$ may be determined. The optimization sequence for first interface 40 may be initiated synchronous with concurrent systems that are incorporated into the first peripheral device 20 and/or second peripheral device 50 that may not be directly affiliated with the adaptive transceiver interface during normal operation.

Sweep trigger 24 initiates the optimization sequence of transmit-receive pair 22, 58 through trigger signal 28. Sweep trigger 24 also controls the period of time $\tau$ the transmitter 22 is to transmit when transmit parameter $\zeta_T$ is configured for value $\alpha_T$, and sets the period of time $\tau$ that receiver 58 is to receive when receive parameter $\zeta_R$ is configured for value $\alpha_R$. The sweep trigger 24 is in communication with the dynamic sequencer 26 which is conjoined to transmitter 22. Because dynamic sequencer 26 communicates through a second interface 42 to dynamic sequencer 56 located in second peripheral device 50, the sweep trigger 24 may also trigger dynamic sequencer 56 synchronous with triggering dynamic sequencer 26. Second interface 42 communicates a synchronizing signal (e.g., sync signal) to dynamic sequencer 56 during the optimization sequence for transmit-receive pair 22, 58 such that that the adjustment of transmit parameters $\zeta_T$ and receive parameters $\zeta_R$ of transmit-receive pair 22, 58 are performed in tandem. The transmit-receive pair 22, 58 subsequently operate with adjusted parameters $\zeta_T$ and $\zeta_R$ for a predetermined period of time $\tau$, at which point the sweep trigger 24 generates a subsequent trigger event on trigger signal 28. The sweep trigger 24 may be preloaded with associated timing sequences that determine the time period during which each transmit parameters $\zeta_T$ and receive parameters $\zeta_R$ are set to their respective values $\alpha_T$ and $\alpha_R$. Sweep trigger 24 is preferably located in first peripheral device 20, however, sweep trigger 24 may also be located in second peripheral device 50.

In one embodiment, for each successive trigger event generated by sweep trigger 24, dynamic sequencer 26 iterates to the next value $\alpha_T$ associated with transmit parameter $\zeta_T$, or may change which parameter $\zeta_T$ is being adjusted, and communicates the updated transmit parameter value $\alpha_T$ to transmitter 22. Synchronous with iterating to the next value, dynamic sequencer 26 may trigger tandem iteration in dynamic sequencer 56 located in second peripheral device 50 by signaling through second interface 42. Upon receiving the sync signal from dynamic sequencer 26 over second interface 42, dynamic sequencer 56 iterates to the next value $\alpha_R$ for receive parameter $\zeta_R$, or may change which parameter $\zeta_R$ is being adjusted, and communicates the updated receiver parameter value $\alpha_R$ to receiver 58 through link 59. In this way, transmit-receive pair 22, 58 may be synchronously configured to sequentially update various combinations of transit and receive parameters $\zeta_T$ and $\zeta_R$ with values $\alpha_T$ and $\alpha_R$ respectively, until sweep trigger 24 has sequenced through a predefined number of timing periods.

In one embodiment, a predefined timing sequence can be preloaded or preprogrammed into sweep trigger 24 and may be autonomously iterated by sweep trigger 24 once initiated. In another embodiment, the sweep trigger 24 is prompted to generate the trigger pulses through signal 44 generated by the analyzer 30, at which point the sweep trigger 24 generates the appropriated trigger signal 28. Whether the trigger sequence is controlled by analyzer 30 or by a preloaded sequence embedded in the sweep trigger 24, the trigger signal 28 induces dynamic sequencers 26 and 56 to update their respective transmit parameter $\zeta_T$ and receive parameter $\zeta_R$ which in turn configures the appropriate transmit-receive block. The optimization sequence continues until all predefined parameter combinations have been iterated, at which time the transmit-receive pair 22, 58 may be configured to a default operating state until final optimized values $\alpha_{Tf}$ and $\alpha_{Rf}$ for transmit parameter $\zeta_T$ and receive parameter $\zeta_R$ respectively are determined by DSP 296, as shown in FIG. 2.

Referring to FIG. 1, the dynamic sequencer 26 may be preloaded or preprogrammed with a predefined sequence of transmitter values $\alpha_T$ that are to be loaded into the targeted transmit parameter $\zeta_T$ when the appropriate trigger signal is detected. Additionally, the dynamic sequencer 56 may be preloaded or preprogrammed with a predefined sequence of receiver values $\alpha_R$ that are to be loaded into the targeted receive parameter $\zeta_R$ when the sync signal transmitted over second interface 42 is detected. Each iteration therefore may incorporate any unique combination of transmit parameters $\zeta_T$ and receive parameters $\zeta_R$ and associated values during the optimization sequencing of transmit-receive pair 22, 58.

Figure 2:
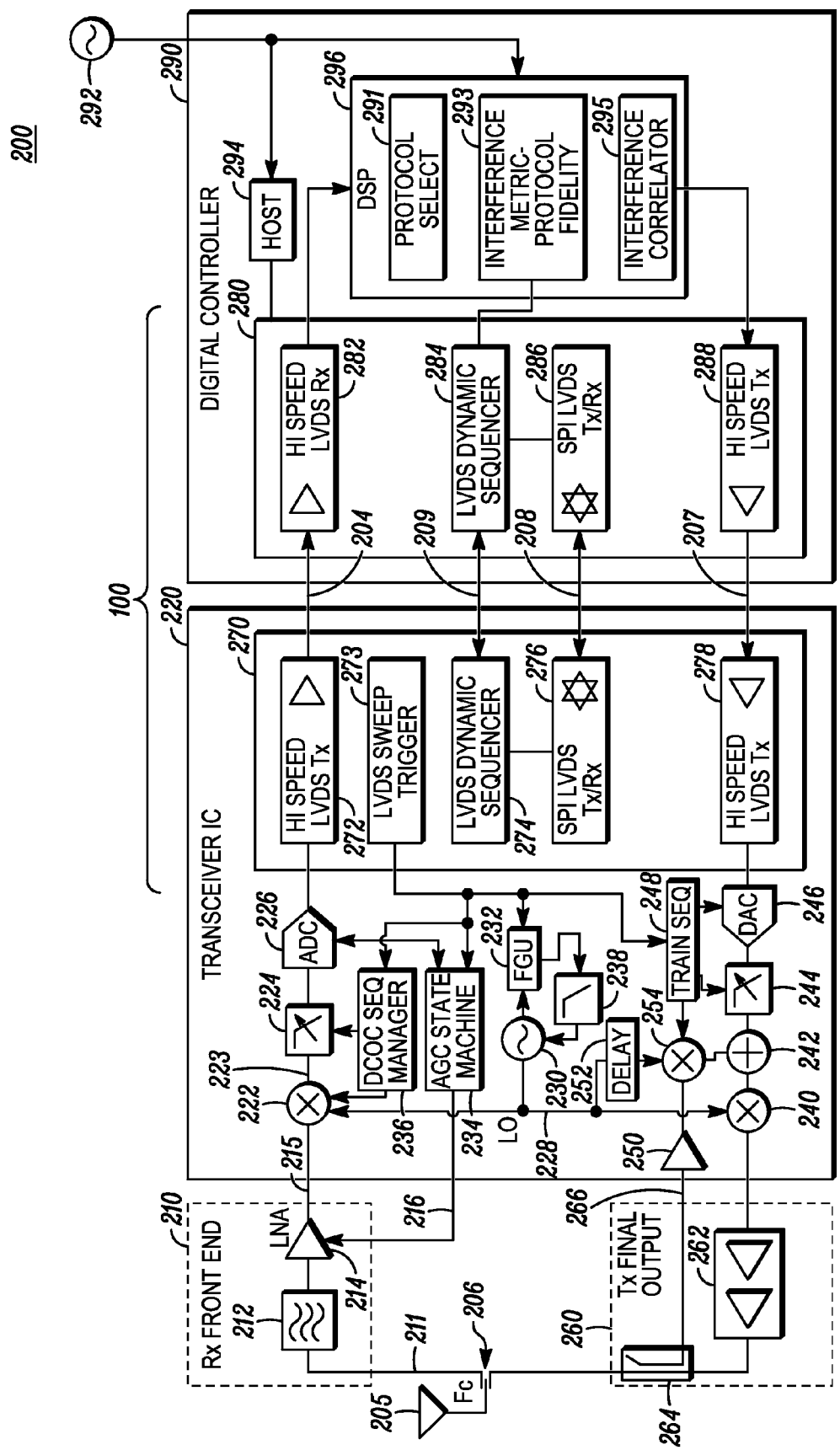
FIG. 2 depicts one embodiment of a block schematic diagram wireless radio system including first and second peripherals that incorporates an adaptive transceiver interface for a radio.

In one embodiment, as illustrated in FIG. 2, the dynamic sequencers may also select which transmit-receive pair or combination of transmit-receive pairs are to be optimized as controlled by the companion dynamic sequencer 26 in first peripheral device 20 and dynamic sequencer 56 in the second peripheral device 50. The dynamic sequencer 26 is connected with the transmitter 22 and may also be connected to any number of transmitters or receivers that form a first half of a transmit-receive pair of a given digital interface as may be included in first peripheral device 20. Dynamic sequencer 26 is connected to all adaptive transmitter and receiver digital blocks in first peripheral device 20 in order to provide synchronization between the various transmitter or receiver systems as they are adjusted during an optimization sequence. In addition, the dynamic sequencer 56 is connected to the receiver 58 and may also be connected to any number of transmitters or receivers that form a second half of a transmit-receive pair of a given digital interface as may be included in second peripheral device 50. Dynamic sequencer 56 is connected to all adaptive transmitter and receiver digital blocks in second peripheral device 50 in order to provide synchronization between the various transmitter or receiver systems, as they too may be adjusted during the adaptive transceiver interface optimization sequence.

Overall synchronization of a transmit-receive pair's tandem adjustment of transmit and receive parameters $\zeta_T$ and $\zeta_R$ are maintained through a synchronization signal transmitted over the second interface 42 wherein dynamic sequencer 26 and dynamic sequencer 56 synchronously adjust their respective parameters. The optimization sequence of any number of transmit-receive pairs composing the adaptive transceiver interface between first and second peripheral devices 20, 50 may occur during a training sequence of a concurrent transceiver system, a training-to-algorithm alignment, and/or during normal transmit and receive operations performed by the transmitter 22 and the receiver 58, respectively. The dynamic sequencers 26 and 56 are preferably inactive during nominal operating conditions of the first and second peripheral devices 20, 50, and are therefore not normally a source of interference or other correlated noise coupling between the first peripheral device 20 and the second peripheral device 50.

A concurrent transceiver system is a system which may be included in transceiver 32 that may operate in parallel with the adaptive transceiver interface 10. Concurrent transceiver systems encompass all fundamental portions of a transceiver 32 including, Local Oscillator (LO) frequency generation, RF receiver and transmitter filter and gain configuration, transmitter modulation systems, and Application Specific Integrated Circuits (ASIC) dedicated to specific processing tasks within the transceiver. Optimization sequencing of a transmit-receive pair 22, 58 may be correlated to the operational status of a given concurrent transceiver system including, but not limited to, synchronization to transceiver Direct Current Offset Correction (DCOC) sequencing, Automatic Gain Control (AGC) state machine status, or RF transmitter modulation training sequencing.

Analyzer 30 is in communication with transmit-receive pair 22, 58 and may also be in communication with sweep trigger 24. Analyzer 30 analyzes the signal fidelity of the signals 41 at receiver 58 as the dynamic sequencer pair 26, 56 iterates the respective transmit-receive pair 22, 58 through the tandem adjustment in transmit and receive parameters $\zeta_T$ and $\zeta_R$ during optimization sequencing of adaptive transceiver interface 10. Analyzer 30 is preferably any device which can perform calculations, and includes things such as a microprocessor, a Field Programmable Gate Array, and a Digital Signal Processor (DSP). A DSP is a specialized microprocessor tailored for real time algorithmic processing of data or real time generation of digital waveforms for radio system applications. The DSP is intended to remove ongoing radio data processing requirements from any host processor so as to improve overall system efficiencies. Preferably, the analyzer 30 correlates protocol requirements to the targeted transmit and receive parameters $\zeta_T$ and $\zeta_R$ when their respective value sequences $\alpha_T$ and $\alpha_R$ are preloaded into the dynamic sequencer pair 26, 56 in preparation for optimization sequencing. The analyzer 30 may select which interference metric or plurality of interference metrics that may be best suited for a given protocol to quantify any interference emissions or susceptibility the adaptive transceiver interface 10 may exhibit during optimization sequencing. In addition, the analyzer 30 may measure the interference level, using an interference metric, during a transmit-receive pair's tandem adjustment in transmit and receive parameters $\zeta_T$ and $\zeta_R$ and correlate the interference measurements in order to provide optimum final values $\alpha_{Tf}$ and $\alpha_{Rf}$ for the parameters $\zeta_T$ and $\zeta_R$ so as to produce minimum interference within the adaptive transceiver interface 10.

In one embodiment, analyzer 30 analyzes a plurality of signals 41 received at receiver 58, each signal associated with a different combination of transmit and receive parameters $\zeta_T$ and $\zeta_R$ having associated values $\alpha_T$ and $\alpha_R$ in order to determine which transmit-receive parameter-value combination provide the best signal fidelity for signals 41. The pertinent information contained in signals 41 and received at receiver 58 is communicated to analyzer 30 through digital connection 45. The transmit-receive parameter-value combination that produces the best signal fidelity while meeting minimum protocol requirements will correspond to the adaptive transceiver interface configuration with the least amount of spurious response or degradations due to correlated noise. Correlated noise is any undesired signal that is associated with, or correlated to, a particular signal source internal or external to the adaptive transceiver interface that produces degraded fidelity of the information being communicated through the transmit-receive pair 22, 58.

Upon analyzing signals transmitted via digital connection 45, the analyzer 30 generates an interference metric based on the quality of the signal 41 for each parameter combination $\zeta_T$ and $\zeta_R$. The interference metric provides a quantitative measurement of the quality of signal 41 indicative of possible spurious responses or other noise coupling between the transmit-receive pair 22, 58, transceiver 32 or other analog or digital subsystems that effect the fidelity of the information contained in signal 41. The interference metric may include, but is not limited to, calculated parameters such as the signal-to-noise (SNR) ratio derived from a frequency domain Fast Fourier Transform (FFT) of signal 41, the bit-error-rate (BER) of the time domain digital bits communicated in signal 41, the signal quality estimate (SQE) as indicated by a Received Signal Strength Indication (RSSI) for a particular signal 41, the power spectral density (PSD) of desired frequency components contained within signal 41, or a quality of service (QoS) as indicated by services supported for a particular signal 41. Upon generating an interference metric for each combination of transmit and receiver parameters, analyzer 30 correlates the plurality of interference metrics with the parameter settings to determine which combination of values for parameters $\zeta_T$ and $\zeta_R$ will optimize transmit-receive pair 22, 58 for minimum spurious response or correlated noise interference.

In one embodiment, analyzer 30 analyzes a plurality of signals over digital connection 43 that originate from transceiver 32 and are to be transmitted by transmitter 22, each signal associated with a different combination of transmit and receive parameters $\zeta_T$ and $\zeta_R$ having associated values $\alpha_T$ and $\alpha_R$ The pertinent information that is to be transmitted by transmitter 22 is communicated to analyzer 30 through digital connection 43 and is analyzed to determine which transmit-receive parameter-value combination provides minimum noise coupling between transceiver 32 and first interface 40. The transmit-receive parameter-value combination that produces the minimum correlated noise coupling while meeting minimum protocol requirements will correspond to the adaptive transceiver interface configuration exhibiting the highest signal fidelity for digital signal 41. Upon generating an interference metric for each combination of transmit and receiver parameters, analyzer 30 correlates the plurality of interference metrics to the parameter settings to determine which combination of values for parameters $\zeta_T$ and $\zeta_R$ will optimize transmit-receive pair 22, 58 for minimum spurious response or correlated noise interference.

In one embodiment, the optimization sequence for transmit-receive pair 22, 58 is performed in a controlled environment that is conducive to minimizing a particular spurious response that may be degrading the information contained in the digital signals 41 intrinsic to interface 40 interconnecting a first and second peripheral devices 20, 50. A spurious response is defined as a degradation of the desired, on-channel received signal resulting from an increase in undesired signals within the receive channel caused by any source external or internal to transceiver 32. Since information embedded in the digital signal 41 can be degraded either in the absence of external signal (i.e., self-quieting spurs), or may require the presence of a second signal to generate undesired noise coupling (e.g., undesired off-channel spurious responses), the optimization strategy used to reduce the amount of spurious interference and/or correlated noise coupling should accommodate multiple interference environments.

For this reason, in one embodiment, optimization of the adaptive transceiver interface 10 is performed concurrent with internal baseband training routines such as Direct Current Offset Correction (DCOC) sequences associated with Direct Conversion Receivers (DCR) or Direct Conversion Transmitters (DCT) and transmit modulation path training for DCT systems incorporating Cartesian feedback. In one embodiment, optimization of the adaptive transceiver interface 10 is executed when AGC state machine 234 is set to maximum attenuation so as to minimize all received signals, on or off channel, following DCR baseband DCOC training in order to identify possible self-quieting sources intrinsic to the wireless transceiver 32 or adaptive transceiver interface 10. A self-quieting spurious response is defined as a degradation of the desired, on-channel received signal resulting from an increase in undesired signals within the receive channel caused by either direct coupling of digital signals 41 into the receive channel or when digital signals 41 is combined with other signals internally generated by transceiver 32.

In one embodiment, optimization of the adaptive transceiver interface 10 is executed when receiving off-channel signals that may induce undesired off-channel spurious responses or intermodulation (IM) interference. An off-channel spurious response is defined as a degradation of the desired, on-channel received signal due to an increase in undesired signal levels within the receive channel that results when an off-channel RF signal being received at the input of transceiver 32 is combined with the digital signals 41 intrinsic to the first interface 40. The undesired spurious response or IM interference will only be present when the undesired off-channel signal is present and adaptive optimization of transmit-receive pair 22, 58 may augment legacy IM or spurious response mitigation strategies.

The minimum required functionality of the adaptive transceiver interface 10 is dictated by protocol constraints. For example, the minimum data rate for first interface 40 must support the data rate specified by the targeted protocol. The minimum data rate for first interface 40 may necessitate a minimum clock speed for the digital signals 41 being communicated over first interface 40, which intern may set a minimum slew rate. In addition, a minimum voltage drive level may be necessary to maintain robust fidelity of digital signals 41 at a given clock speed for the stray capacitance intrinsic to real world circuits and interconnections of first interface 40. Therefore all interference metric characterizations by analyzer 30 are measured in conjunction with maintaining minimum fidelity of digital signals 41 as may be necessary to support the targeted protocol. However, added flexibility beyond these minimum requirements may be exploited to further minimize any noise coupling present between the low noise, analog RF stages and the digital processing stages while optimizing the overall system for the lowest current drain or power consumption.

The ability to quantify interference, as well as modify characteristics of signal 41 such as signal timing, transition ringing and signal shaping provides a way to optimize current drain and data transmission reliability while keeping interference with other peripheral components in proximity to the adaptive transceiver interface 10 at a minimum. The adaptive transceiver interface 10 may modify its power consumption by changing slew rate and termination impedance to meet minimum protocol requirements while simultaneously employing "soft decision decoding" of binary information communicated over first interface 40 so as to optimize link performance for electromagnetic interference (EMI) and power drain.

If a plurality of digital transmit-receive pairs 22, 58 are deployed to form a plurality of adaptive first interfaces 40, and are oriented to form bi-directional digital links from a common peripheral device 20 to a plurality of other peripheral devices, then the adaptive transceiver interface 10 may adaptively optimize only one interface (first interface 40) and assume that the optimized transmit and receive parameters $\zeta_T$ and $\zeta_R$ can be extrapolated to the other transmit-receive pairs. The goals of adaptive transceiver interface 10 include mitigation of inter-chip transmission errors while not interfering with the wireless transceiver 32 of the first peripheral device 20. This is accomplished by optimizing the transmit and receive parameters $\zeta_T$ and $\zeta_R$ that configure the various digital interfaces within the adaptive transceiver interface 10 dynamically, adaptively and in real time.

One embodiment of optimizing the adaptive transceiver interface may employ a self generated training tone of known frequency composition that may then received by an on-board receiver embedded in transceiver 32, subsequently sampled by the analog-to-digital converter (ADC) and then demodulated and digitally processed to evaluate spurious responses and correlated noise coupling. The tandem iteration of transmit and receive parameters $\zeta_T$ and $\zeta_R$ is accomplished as described in previous sections of this specification; however, the interference metric is derived by analyzing the self-generated training tone.

FIG. 2 illustrates in greater detail a wireless communication system (also referred to herein as a radio system) 200 incorporating a bi-directional adaptive transceiver interface 100 interconnecting a transceiver 220 to a digital controller 290. The bi-directional adaptive transceiver interface 100 includes a first terminal 270 and a second terminal 280 interconnected by a plurality of interfaces 204, 207, 208, and 209. The first and second terminal pair incorporate a first transmit-receive pair 272, 282 connected by a receive interface 204 that communicates from transceiver 220 to the digital controller 290, a second transmit-receive pair 288, 278 connected by transmit interface 207 that communicates from the digital controller 290 to transceiver 220, paired dynamic sequencers 274, 284 interconnected by sync interface 209 and sweep trigger 273. In addition, a Serial Port Interface (SPI) 208 provides a means through which the digital controller 290 may program the transceiver 220, including the adaptive transceiver interface 100, for specific configurations that meet targeted protocol requirements.

Transceiver 220 and the associated wireless peripherals (receiver front end 210 and transmitter final output 260) are interconnected forming systems for receive, transmit and frequency synthesis operations. The receiver subsystem comprises receiver front end 210, and various components of the transceiver 220 including mixer 222, tunable filter 224, ADC 226 and any post processing stages following the ADC prior to the first terminal 270, AGC state machine 234 and DCOC sequence manger 236. The transmit system shown in FIG. 2 is a Direct Conversion Transmitter (DCT) comprising transmit final output 260, and various subsystems of transceiver 220 including a baseband In-phase/Quadrature Phase (I/Q) modulation path, a Cartesian feedback path and a transmit modulator 240. The transmit I/Q modulation path comprises DAC 246, tunable filter 244 and summer 242. The Cartesian feedback path comprises a buffer 250, a delay block 252 and a mixer 254. The frequency synthesis system of transceiver 220 comprises a voltage controlled oscillator (VCO) 230, a frequency generation unit (FGU) 232, and a loop filter 238. While details of the wireless RF radio system 200 will be delineated herein, the various embodiments are applicable to any type of digital interconnection strategy between devices, including but not limited to, wireless RF radio system, optically coupled communication systems, broadband coaxial cable modems, or switched-packet-data based computer networks.

The wireless transceiver 220 is connected to receiver front end 210 and transmitter final output 260, both of which may be connected to antenna 205 through antenna switch 206. The antenna 205 is connected to an antenna switch 206 which routes received RF signals from the antenna 205 to the receiver front end 210 in receive mode, and routes a continuous RF signal from the transmitter final output 260 to the antenna 205 in transmit mode. The antenna switch 206 may be a generic representation of a switch, or a duplexer, or any other mechanism by which RF signals are routed to- and -from appropriate radio system blocks to facilitate proper radio system operation.

The receiver front end 210 contains at least one preselector filter 212 and at least one low noise amplifier (LNA) 214. The preselector filter 212 is a RF filter that attenuates undesired out-of-band received RF signals that may be present at the antenna 205 when the transceiver is in receive mode. While FIG. 2 includes one preselector filter 212 for illustrative purposes, a plurality of preselector filters incorporating a plurality of topologies can be incorporated into receiver front end 210 based on specific receiver requirements. The LNA 214 is an amplification stage that increases the signal level of a received signal while simultaneously affecting output noise such that an overall received Signal-to-Noise Ratio (SNR) at an output 215 of the LNA 214 is improved over the SNR at the input 211. The gain of LNA 214 can be varied by changing the control voltage 216. The control voltage 216 is generated by AGC state machine 234 so as to maintain an optimum LNA output signal level for all receiver operating environments.

Output signal 215 from the receiver front end 210 is routed to the receiver subsystem incorporated in transceiver 220. The input receive stage for transceiver 220 is mixer 222 which mixes output signal 215 with a local oscillator (LO) signal 228 so as to translate the received RF signal to an intermediate frequency (IF) signal 223. In one embodiment, the IF signal may be a quadrature signal composed of an in-phase signal and a quadrature phase signal wherein the quadrature phase signal is phase offset from the in-phase signal by 90 degrees. In one embodiment, the LO signal and the desired on-channel received RF signal may be approximately equal, thereby designating the receiver configuration as a Direct Conversion Receiver (DCR) and the receiver mixer 222 as a down mixer. For DCR receivers, the desired IF signal 223 may range from baseband DC to tens of kHz.

The IF signal 223 is subsequently filtered at tunable IF filter 224 which functions to attenuate undesired, off-channel signals that may be present in IF signal 223. The IF bandwidth (IFBW) for the tunable IF filter 224 is variable, and may be programmed to a desired IFBW by the host controller via the SPI interface 209 to accommodate various modulation bandwidths as necessitated by various wireless protocols. In one embodiment, where the receiver is a DCR, the tunable IF filter 224 is a Low Pass filter (LPF) configuration for both the in-phase and quadrature-phase signal paths. While FIG. 2 includes one tunable LPF filter 224 for illustrative purposes, a plurality of LPF filters incorporating a plurality of topologies can be incorporated into the IF section of transceiver 220 based on specific receiver requirements. In addition, a plurality of IF amplifying stages (not shown in FIG. 2) can be incorporated into the IF section of transceiver 220 to amplify desired on-channel IF signals as may be required to meet specific receiver requirements.

The output signal from tunable IF filter 224 is subsequently sampled by ADC 226. The ADC 226 samples the filtered IF signal at a predefined sample rate as necessitated to meet specific protocol requirements, thereby converting the analog received IF signal into a sampled representation of the IF signal. Preferably, ADC 226 samples the analog IF signal at a rate that must meet or exceed the minimum threshold as defined by Nyquist Sampling Criteria in order to preserve all pertinent received information within the sampled received IF signal. The ADC sampled IF signal may be processed by other post-processing digital stages (not shown in FIG. 2) that may include, but not limited to, rescaling of the digital sample rate, Infinite Impulse Response (IIR) and Finite Impulse Response (FIR) filtering, and formatting of the digital samples for transmission across the adaptive transceiver interface 100.

AGC state machine 234 may operate to adjust the gain of various gain stages that may be distributed throughout receiver front end 210 and the receiver subsystem in transceiver 220. AGC state machine 234 processes the sampled IF signal output from ADC 226 and compares the sampled IF signal level to predefined thresholds to generate a control voltage 216 for controlling at least one gain stage within the receiver system. Any number of nodes within the receiver portion of the transceiver 220 may be used to generate an input signal into the AGC state machine 234. The gain stages that may be controlled by the AGC state machine 234 may include, but are not limited to, the LNA 214 and/or IF gain stages (not shown) which may have their respective gain settings adjusted based on the received signal level and the threshold configuration of AGC state machine 234. In this way, AGC state machine 234, LNA 214, and ADC 226 providing the sampled received IF signal input to AGC state machine 234 illustrate a closed loop AGC system in FIG. 2 that may operate independent of or in sequence with other receiver portions of the transceiver 220, such as a direct current offset correction (DCOC) sequence manager 236. The closed loop AGC system illustrated in FIG. 2 is an example of a concurrent transceiver system that can be integrated into the optimization sequencing of adaptive transceiver interface 100.

The DCOC sequence manager 236 is a control system that sequences through various training processes within the receiver portion of transceiver 220 so as to minimize distortion of the received IF signal attributed to baseband DC offset errors. DCOC training sequences controlled by sequence manager 236 mitigate degraded receiver performance caused by external parametric variations in the receiver operating environment and limitations in real world circuit designs associated with process, component tolerance and layout configurations. Generally, the DCOC sequence manager 236 may control DCOC training sequences in both analog circuits, defined as baseband circuits between the mixer 222 and ADC 226, and in digital processing stages, as defined in post-processing digital blocks following ADC 226 that algorithmically minimize DCOC errors in the sampled received IF signal. When initiating DCOC training, DCOC sequence manager 236 may interactively interrupt normal operations of AGC state machine 234 and may control various baseband operating states and post ADC digital processing states not shown in FIG. 2 so as to minimize DC offset error distortion. Since DCOC training may prevent normal receive operations by front end 210 and transceiver 220, and there may be no a priori knowledge of when the DCOC training sequence may be required, proper operation of a DCR is dependant upon proper control of the initiation, duration and resolution of DCOC training sequence. DCOC sequence manager 236 and the associated DCOC compensation stages are an example of a concurrent transceiver system that can be integrated into the optimization sequencing of adaptive transceiver interface 100.

The transceiver 220 also includes a frequency synthesis subsystem that generates LO signal 228. The frequency synthesis subsystem may include a VCO 230, a Frequency Generation Unit (FGU) 232 and filter 238 to form a Phase Locked Loop (PLL) whereby the LO signal 228 is generated. The FGU is also known as a frequency synthesizer and functions by comparing the VCO output frequency to a reference frequency source (not shown in FIG. 2) and generating a control voltage designed to steer the VCO to the correct operating frequency. The output control voltage is filtered by loop filter 238 to minimize sideband noise and FGU spur responses. In one embodiment, some parameters of the FGU 232 and filter 238 may be adjusted to modify the PLL operating characteristics as may be necessary to meet various protocol requirements. LO signal 228 is applied to various mixer blocks when the transceiver 220 is operating in receive or transmit mode, and/or may alternatively be applied to other stages including transmit amplifier stages. While FIG. 2 illustrates a single VCO and associated LO signal path, a plurality of VCOs and LO signal paths connected to a plurality of mixers or other stages may be implemented in various receive and transmit configurations as may be necessary to meet operating frequency requirements of the transceiver 220. The PLL incorporated into transceiver 120 is an example of a concurrent transceiver system that can be integrated into the optimization sequencing of adaptive transceiver interface 100.

The transceiver 220 may also include a transmit subsystem. The transmit subsystem translates digital information from digital controller 290 into a modulated RF signal that is transmitted at antenna 205. While FIG. 2 illustrates a Direct Conversion Transmit (DCT) topology with Cartesian Feedback, it is apparent to one skilled in the art that any number of different transmitter topologies or combinations thereof, may be adapted to incorporate the features described herein.

The transmit baseband I/Q modulation path, also referred to as the forward I/Q modulation portion of the transmit subsystem, comprises Digital-to-Analog Converter (DAC) 246, tunable filter 244 and summer block 242. DAC 246 is a complex DAC pair for converting digital information from digital controller 290 into modulation signals, and preferably baseband I/Q transmit modulation signals. The baseband I/Q signals are defined as in-phase and quadrature-phase signal representations of Cartesian coordinates within a complex I/Q modulation system. Tunable filter 244 represents a simplified filtering strategy for complex I/Q signal pairs, wherein undesired quantization noise created by DAC 246 and non-linearities intrinsic in the circuit implementation are attenuated. Generally, the transmit baseband filter 244 may be tunable to support various transmit modulation signal bandwidth requirements, and may incorporate a Low Pass Filter topology. Summer block 242 combines a pre-distortion signal originating from the Cartesian feedback path with the I/Q baseband signal pair so as to so as to mitigate Power Amplifier (PA) non-linearity distortion effects. In one embodiment, there may be a separate transmit summer for each of quadrature modulator that may be incorporated in the transmit portion of the transceiver 220.

The transmit modulator 240, which may also be referred to as a transmitter up-mixer, combines a transmit baseband modulation signal with a LO signal to produced a modulated continuous transmit RF signal. The continuous transmit RF signal from the transmit modulator 240 may be further amplified by a transmitter final output 260 prior to being sent to the antenna switch 206 for routing to the antenna 205. In one embodiment, the transmit modulator 240 may include a quadrature mixer topology composed of an in-phase modulator and a quadrature phase modulator wherein the output signal of the quadrature phase modulator is phase offset from the in-phase modulator output signal by 90 degrees.

The Cartesian Feedback (CFB) portion of the transmit subsystem comprises coupler 264, buffer 250, delay block 252 and down mixer 254. Coupler 264 couples a potion of the modulated continuous transmit RF signal at the output of transmit PA 262 into buffer 250 thereby providing an feedback signal 266 into the CFB subsystem. Buffer 250 provides a buffering stage to isolate CFB components in transceiver 220 from external stray effects. The buffered feedback signal is down-mixed at feedback down mixer 254. For transmit portions of transceivers which incorporate a CFB compensation capability, the transmit feedback down mixer 254 functions to convert the buffered feedback signal to complex baseband error signals. The complex baseband error signals may then be combined with baseband modulation path complex IQ signals at summer 242 in order to compensate distortion effects in the modulated continuous transmit RF signal that may be induced by PA 262 non-linearities. Delay block 252 functions to delay an internally generated transmit LO signal by a set phase offset to compensate for associated delays induced in a RF signal path from the output of modulator 240 thru PA 262, coupler 264, to the output of feedback buffer 250.

Transceiver 220 also includes a transmit training sequencer 248 which iterates the transmit baseband I/Q modulation path and the CFB path of the transceiver 220 through a training sequence. By comparing the transmit CFB signal to a known training signal during a transmit training sequence, an error signal can be determined that is then used to pre-distort the baseband I/Q modulation signal so as to minimize the error. Once the pre-distortion signal for the forward I/Q modulation path is known, the pre-distortion can be digitally applied to the transmit DAC 246 and/or subsequent I/Q modulation path stages so as to mitigate non-linear distortion products that may have degraded the signal fidelity of the modulated continuous transmit RF signal. Transmit training sequencer 248 and the associated transmit modulation path compensation stages are an example of a concurrent transceiver system that can be integrated into the optimization sequencing of adaptive transceiver interface 100.

The transmitter final output 260 is a general transmitter subsystem containing the final PA 262, a coupler 264, and any other device of the transmit portion as may be necessary to properly control and route a continuous transmit RF signal. The transmit final PA 262 is the final amplifier stage in the transmit portion of the transceiver 220 and is used to increase the power of the transmit RF signal prior to radiating RF energy at the antenna 205. Coupler 264 functions to couple RF energy from the transmitter RF signal path. The coupled RF energy may be subsequently used to compensate transmit distortion effects or for power output level control (not shown).

The transceiver 220 includes a first interface terminal 270. The first interface terminal 270, in conjunction with second interface terminal 280 incorporated into digital controller 290 are connected to each other via a plurality of interface connections 204, 207, 208, and 209 to form the adaptive transceiver interface 100. The adaptive transceiver interface 100 contains a dynamic sequencer sync interface 209 and associated trigger processors and at least one, or all of the following: a receive interface 204 for communicating the sampled received data, a transmit interface 207 for communicating the transmit modulation sampled data, an SPI configuration interface 208. The adaptive transceiver interface 100 illustrated in FIG. 2 is a bi-directional interface allowing information to be communicated from transceiver 220 to digital controller 290, and also allowing information to be communicated from digital controller 290 to transceiver 220.

Adaptive transceiver interface 100 incorporates transmit-receive pair 272, 282 connected by receive interface 204. Transmitter 272 may be a high speed LVDS transmitter for transmitting information through LVDS receive interface 204. Receiver 282 may be a high speed LVDS receiver for receiving information from LVDS receive interface 204. The transmit-receive pair 272, 282 may communicate binary representation of sampled received data, sample clock signal and sample framing designators. The transmit-receive pair 272, 282 is adjustable as may be necessary to support various protocol requirements. In this manner, transceiver 220 can communicate formatted sampled receive data to digital controller 290. Transmit-receiver pair 272, 282 of FIG. 2 may correspond to transmit-receive pair 22, 58 of FIG. 1.

Adaptive transceiver interface 100 also incorporates transmit-receive pair 288, 278 connected by transmit interface 207. Transmitter 288 may be a high speed LVDS transmitter for transmitting information through LVDS transmit interface 207. Receiver 278 may be a high speed LVDS receiver for receiving information from LVDS transmit interface 207. The transmit-receive pair 288, 278 may communicate binary representation of transmit modulation data, sample clock signal and sample framing designators. The transmit-receive pair 288, 278 is adjustable as may be necessary to support various protocol requirements. In this manner, digital controller 290 can communicate formatted sampled transmit modulation information to transceiver 220. Transmit-receiver pair 288, 278 of FIG. 2 may also correspond to transmit-receive pair 22, 58 of FIG. 1.

The LVDS sweep trigger 273 is a sweep trigger which controls the timing of the optimization sequence for adaptive transceiver interface 100 as described in FIG. 1. LVDS sweep trigger 273 of FIG. 2 corresponds to sweep trigger 24 of FIG. 1. Sweep trigger 273 is illustrated in FIG. 2 as located in transceiver 220, however, sweep trigger 273 may alternatively be located in digital controller 290 to facilitate implementation strategies. Synchronization between the LVDS interface training, training-to-algorithm alignment and ongoing receive/transmit operations is another function of the LVDS sweep trigger 273. The LVDS sweep trigger 273 may be preloaded by host processor 294 with associated timing periods τ to regulate timing of the optimization sequence as iterated by LVDS dynamic sequencer pair 274, 284.

The LVDS dynamic sequencer pair 274, 284 is a low voltage differential signaling dynamic sequencer pair which sequences the parameters of a targeted transmit-receive pair within the adaptive transceiver interface 100. Dynamic sequencer pair 274, 284 is connected together through sync interface 209. Sync interface 209 may be any interface appropriate for maintaining synchronization between dynamic sequencer pair 274, 284, including, but not limited to, LVDS serial interface, single wire trigger interface, Small Computer System Interface (SCSI), or fiber channel. Dynamic sequencer pair 274, 284 of FIG. 2 corresponds to dynamic sequencers 26, 56 of FIG. 1; synchronization interface 209 of FIG. 2 corresponds to second interface 42 of FIG. 1. In addition to sequencing the transmit and receive parameters $\zeta_T$ and $\zeta_R$, the dynamic sequencer pair 274, 284 selects which interface (transmit interface 207, receive interface 204 or both) is to be optimized within a given optimization sequence. Each transmit-receive parameter $\zeta_T$ and $\zeta_R$ may be independently affiliated to a targeted block at each iteration step within an optimization sequence. Therefore, transmit-receive pair 272, 282 and receive interface 204 may be adjusted in the first part of an optimization sequence, followed by tandem adjustment to transmitters 272 and 288 of receive and transmit interfaces 204 and 207 in a second part of an optimization, followed by tandem adjustment of receivers 282 and 278 in a third part of an optimization, where part 1, part 2 and part 3 comprise a complete optimization sequence continuously iterated by dynamic sequencer pair 274, 284. By extension, it is apparent that any combination of transmitters 272, 288, to receivers 282, 278, or transmitters to transmitters, or receivers to receivers can by incorporated into the optimization sequence of adaptive transceiver interface 100 as iterated by dynamic sequencer pair 274, 284. The LVDS dynamic sequencer pair 274, 284 and the sync interface 209 may be inactive during nominal operating conditions of the transceiver 220 and the digital controller 290 and is therefore not normally an interference source.

The SPI interface 208 between digital controller 290 and transceiver 220 may be a bi-directional LVDS serial port interface (SPI) incorporating both transmit and receive low voltage differential signaling. The LVDS SPI transceiver pair 276, 286 communicate over SPI interface 208 and is the interface through which a host processor 294 of the digital controller 290 will configure the receive portion and/or transmit portion of the transceiver 220 for nominal operation. The SPI LVDS block 286 may be connected to a plurality of integrated circuits (IC) including the transceiver 220, and may incorporate a plurality of connections to each IC including, but not limited to a data connection, a clock connection and a "chip enable" (CE) connection. The CE connection is unique to each IC to which the SPI LVDS block 286 is connected.

Digital controller 290 is a generic controller system used to enable a variety of digital applications including command and control of wireless modem interfaces, machine access control (MAC), layer accessory drivers, and advanced digital signal processor (DSP) data manipulation. In one embodiment, digital controller 290 includes a host processor 294, a digital signal processor (DSP) 296, memory and associated memory management (not shown), and an interface system including SPI LVDS block 286 to communicate to other peripherals both inside and outside the digital controller system.

Preferably, digital controller 290 is in communication with a reference clock 292 which provides a time base from which all control and command processes are sequenced. Preferably, a plurality of reference clocks 292 are connected to different peripherals, such as integrated circuits, in radio system 200 including both the digital controller 290 and the transceiver 220, each reference clock 292 having a different operating frequency. However, the operating frequency of a given peripheral's reference clock 292 sets that peripheral's processing speed and thereby determines its maximum response time.

Host processor 294 is preferably a generic micro computer that controls the configuration of the radio system 200 and is the system that process higher level software routines that facilitate the user interface and accessory capabilities. In one embodiment, host processor 294 may trigger sweep trigger 273 to initiate an optimization sequence of adaptive transceiver interface 100 via SPI interface 208 while simultaneously initiating interference correlator block 295 to begin interference measurements.

DSP 296 is a specialized microprocessor tailored for real time algorithmic processing of data or real time generation of digital waveforms for radio system applications. The DSP 296 is intended to remove ongoing radio data processing requirements from the host processor 294 to improve overall system efficiencies. Preferably, DSP 296 correlates the protocol requirements to the sweep parameters that are preload into the dynamic sequencer pair 274, 284 within protocol select processing stage 291. The DSP 296 also targets which interference metric or plurality of metrics that may be used to characterize system interference during optimization sequencing of the adaptive transceiver interface 100 in the interference metric block 293. DSP 296 measures the interference level using the interference metric during optimization sequencing of various LVDS transmit and receive parameters $\zeta_T$ and $\zeta_R$ and correlates the measurements to final LVDS settings $\alpha_{Tf}$ and $\alpha_{Rf}$ for minimum interference in the interference correlator block 295. DSP 296 of FIG. 2 corresponds to analyzer 30 of FIG. 1 with all associate functions and capability.

Figure 3A:
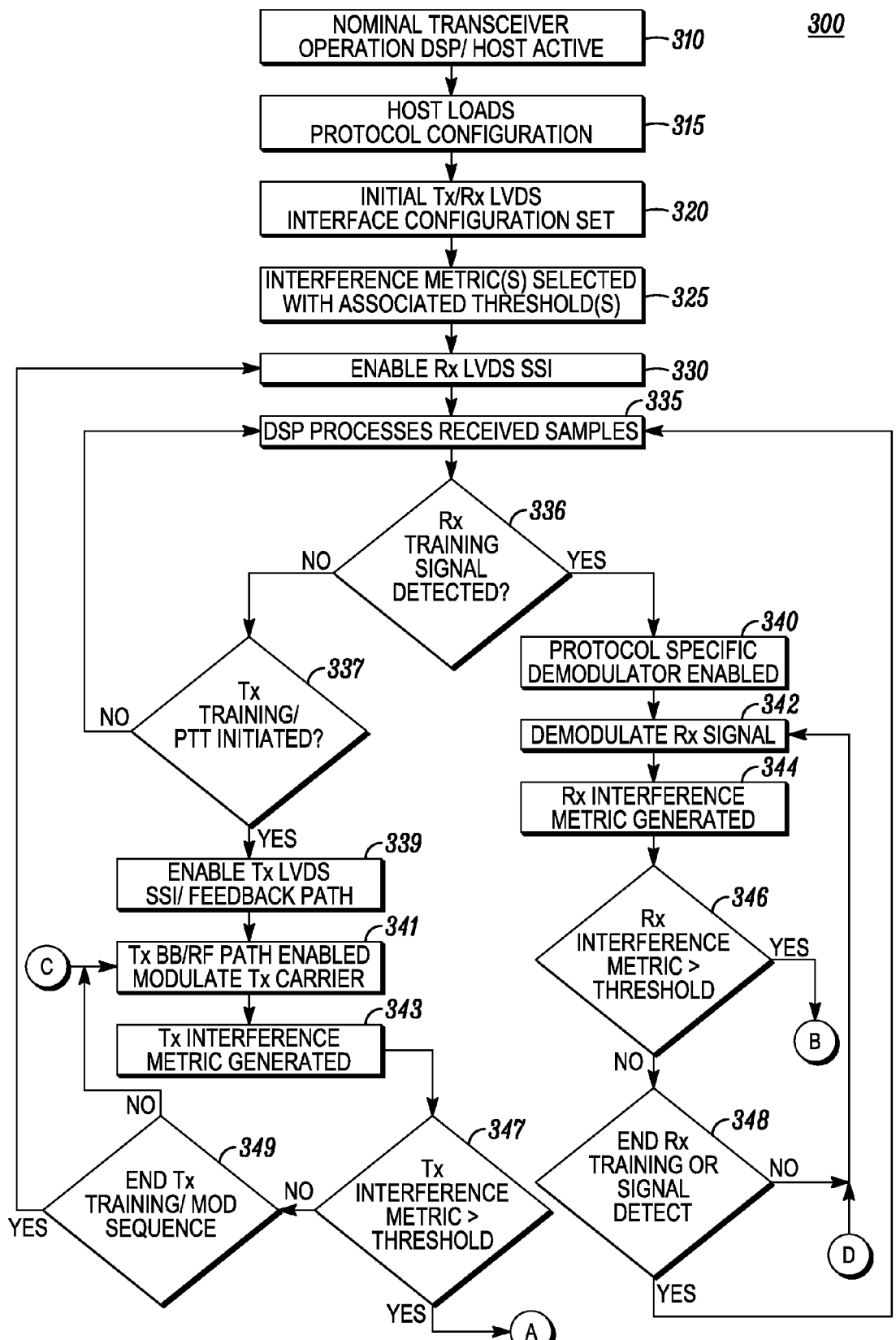
FIGS. 3A and 3B depict one embodiment of a flow chart of a method of operation for the adaptive transceiver interface depicted in FIG. 2.
Figure 3B:
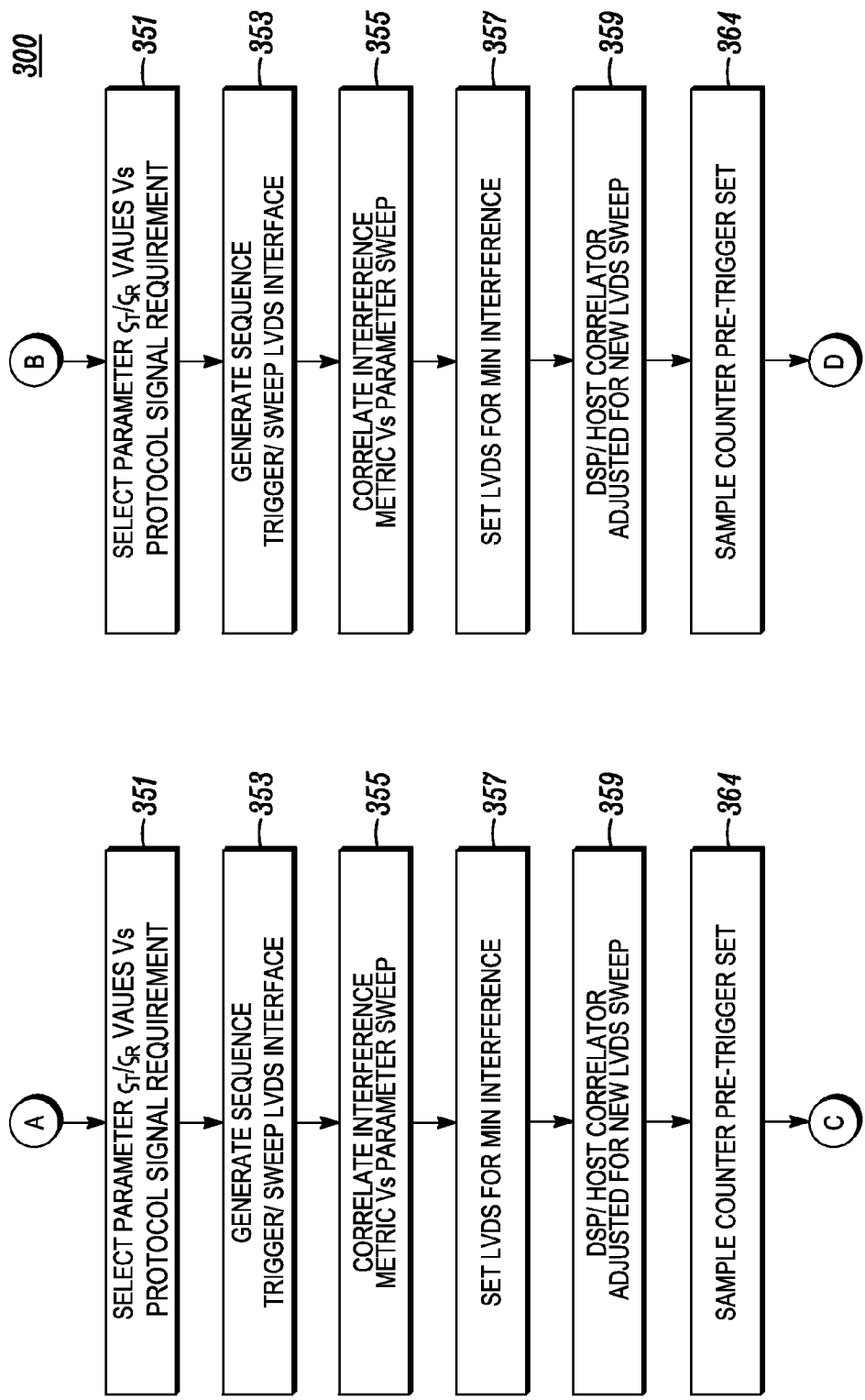

FIGS. 3A and 3B are flow charts showing a method 300 used in operation by the adaptive transceiver interface 100. The method 300 is an algorithm which runs during nominal operation of transceiver 220, e.g. as indicated by a controller (not shown) which controls functional operations of the adaptive transceiver interface 100. The method 300 thus begins in FIG. 3A at a step 310 which indicates that nominal operation of transceiver 220 is occurring and that the DSP 296 and the host processor 294 are both active. Next, the host processor 294 loads a protocol configuration in step 315, indicating which protocol is to be used when communicating between the transceiver 220 and the digital controller 290. Then, at step 320, the initial conditions for the adaptive transceiver interface 100 are set, allowing the transceiver 220 and the digital controller 290 to communicate using the protocol loaded in step 315. Also at step 320, the host processor 294 may preprogram which transmit and receive parameters $\zeta_T$ and $\zeta_R$ and their associated values $\alpha_T$ and $\alpha_R$ are to be applied during the optimization sequence of adaptive transceiver interface 100.

Moving to step 325, the interference metric or plurality of metrics to be measured when iterating the optimization sequence is selected with associated thresholds defining what are the acceptable levels of spurious response or correlated noise interference based upon the specific protocol loaded in step 315. Then, at step 330, the receive interface 204 is enabled, allowing for signals to be transmitted from the transmitter 272 to the receiver 282. Preferably, the receive interface 204 is a synchronous serial interface (SSI). Then at step 335, the DSP 296 processes samples of the signals communicated from the transceiver 220 through the transmit-receive pair 272, 282 comprising a portion of the adaptive transceiver interface 100. In a decision step 336, the DSP 296 then determines whether a previously scheduled receiver training sequence is to be executed or if an on-channel received signal is detected in the sampled received signal communicated from transceiver 220 to digital controller 290 through receive interface 204. If either condition is detected this would differentiate whether or not the radio system 200 is being trained or not, or whether or not the radio system 200 is receiving a desired on-channel signal necessitating an appropriate response as required by the particular radio application. In one embodiment, some radio receiver training processes cannot occur simultaneous with normal operations; however, either condition is compatible with conducting an optimization sequence of the adaptive transceiver interface 100. If an on-channel received signal is detected or if a receiver training process is to be executed, then the method 300 proceeds to step 340 from step 336, otherwise, the method 300 moves to step 337.

In a decision step 337, the DSP 296 determines whether a previously scheduled transmitter training process is to occur or if the radio system 200 push-to-talk (PTT) has been initiated requiring a modulation signal or other transmit information to be communicated over the transmit interface 207. If either condition is detected, this would indicate whether or not the radio system 200 is being trained or not, or whether or not the radio system 200 is communicating modulation or other transmitter signals over the transmit interface 207 necessitating an appropriate response as required by the particular radio application. In one embodiment, some radio transmitter training processes cannot occur simultaneous with normal operations, however, either condition is compatible conducting an optimization sequence of the adaptive transceiver interface 100. If a transmitter training signal or a transmit modulation signal is to be communicated over the transmit interface 207, then the method 300 moves to step 339, otherwise, the method 300 moves back to step 335.

At step 340, protocol specific processing of receive samples is enabled by the DSP 296, which processes the sampled received signals communicated from transceiver 220 over transmit-receive pair 272, 282 through interface 204. Next, at step 342, the sample received signals are demodulated to extract the desired information that is being communicated to the radio system 200 over the wireless channel. After a sufficient number of samples have been received to allow an accurate calculation of the interference metric, a receive interference metric is generated from the sample received signals communicated over transceiver 220 at step 344. At step 346, the DSP 296 determines if the interference metric previously calculated at step 344 is greater than the protocol specific threshold previously selected at step 325. If the DSP 296 calculates an interference metric that indicates an acceptable interference level, method 300 moves from step 346 to step 348 to determine if the on-channel signal is still present or whether the training process is completed. If the receive signal is still present or if the receive training process is ongoing, method 300 proceeds back to step 342 to resume demodulation of the sampled received signal. Steps 342, 344, 346, and 348 form a loop that is continuously cycled as long as the interference metric indicates acceptable interference levels while a receive process (on-channel signal or training) is ongoing. Training processes that may be conducted while cycling through steps 342, 344, 346 and 348, may include but not limited to a sequence manager 236 controlled DCOC sequence as shown in FIG. 2. Once the receive process is finished and the interference metric continues to indicate acceptable interference levels, step 348 branches back to step 335 to resume normal receive channel monitoring. However, if the interference metric at step 346 indicates a level of interference greater than a predetermined threshold selected in step 325, then the method 300 moves from step 346 to step 351 of FIG. 3B as designated by node B. The predetermined threshold used in step 346 is preferably protocol specific, and is preferably preprogrammed in advance into the DSP 296.

At step 339, the transmit interface 207 is enabled by the DSP 296. Next, at step 341, a transmit baseband and RF path is enabled to allow the signals that are communicated over transmit interface 207 to be processed and modulated onto the RF signal. After a protocol specific analysis period, a transmit interference metric is generated at step 343 for the signals sent over the transmit interface 207.

At step 347, DSP 296 determines if the interference metric previously calculated at step 343 is greater than the protocol specific threshold previously set at step 325. If the interference metric indicates an acceptable interference level, method 300 moves from step 347 to step 349 to determine if the transmit modulated signal is still required or whether the transmit training process is completed. If the transmit modulation is still required (e.g., the PTT is still activated) or if the transmit training process is ongoing, method 300 proceeds back to step 341 to resume transmit operations.

Steps 341, 343, 347, and 349 form a loop that is continuously cycled as long as the interference metric indicates acceptable interference levels while a transmit process (PTT active or transmit training) is ongoing. Transmit training processes that may be conducted while cycling through steps 341, 343, 347 and 349, may include but not limited to, training sequencer 248 optimizing CFB and baseband modulation path as shown in FIG. 2.

Once the transmit process is finished and the interference metric continues to indicate acceptable interference levels at step 347, step 349 branches back to step 330 to enable the receive interface 204 in preparation to resume normal receive channel monitoring. However, if the interference metric generated at step 347 for the signals sent over the transmit interface 207 indicates interference levels that exceeds acceptable levels, method 300 moves from step 347 to step 351 shown in FIG. 3B as designated by node A. The predetermined threshold used in step 347 is preferably protocol specific, and is preferably preprogrammed in advance into the DSP 296.

At step 351, at least one transmit and/or receive parameter $\zeta_T$ and/or $\zeta_R$ is selected for adjustment based on the protocol loaded in step 315 for the LVDS receive interface 204 and/or transmit interface 207 and/or SPI interface 208 used for communication between the transceiver 220 and the digital controller 290. The parameter $\zeta_T$ and/or $\zeta_R$ selected at step 351, and their associated range of values, may be selected based on a number of factors, including the type of interference detected (e.g.: self-quieter vs. off-channel spurious response), prioritization of the parameter and its associate values relative to predefined ranking, sensitivity analysis and gradient scaling of parameter values from past training results, and meeting minimum protocol requirements for the digital signals at the interface being optimized. The parameter values $\alpha_T$ and $\alpha_R$ are preloaded into dynamic sequencer pair 274, 284 as well as the associated training periods $\tau$ into sweep trigger 273 for each parameter iteration.

Moving to step 353, the LVDS optimization sequence is triggered and a series of interference metrics are generated as the optimization sequence varies values $\alpha$ of the selected parameter $\zeta_k$. Preferably one interference metric is generated for each value $\alpha$ used for the selected parameter $\zeta_k$. Note that $\alpha$ is a generic representation for $\alpha_T$ and $\alpha_R$, and $\zeta_k$ is a generic representation for $\zeta_T$ and $\zeta_R$.

At step 355, each interference metric and its associated transmit and/or receive values $\alpha$ are correlated to determine the optimum value $\alpha$ to produce minimum interference. This may include interpolating between two parameter values $\alpha_1$ and $\alpha_2$ to produce a third value $\alpha_3$ that is predicted to achieve minimum interference without actually being included in the iteration comprising the optimization sequence.

At step 357, the final value $\alpha_f$ for the targeted parameter $\zeta_k$ that produces an interference metric indicating the least amount of interference is loaded into the adaptive transceiver interface 100 for use when transmitting and receiving the protocol loaded in step 315. Following optimization of the transmit-receive parameters $\zeta_k$ at 357, the DSP 296 and/or host processor 294 may adjust the interference metric correlator to include different parameter values or even new parameters not incorporated into the previous optimization sequence at step 359. After the correlator has been adjusted from the previous optimization sequence, the sample counter pre-trigger is set at 364 so that after a predetermined number of transmit or receive samples have been communicated over receive interface 204 or transmit interface 207, method 300 will resume normal operation.

Completion of step 364 marks the termination of the optimization sequence for the adaptive transceiver interface 100. If the optimization sequence is initiated during transmit operations as designated by node A, method 300 re-enters the transmit operations at block 341 from node C in FIG. 3A from step 364. If the optimization sequence is initiated during receive operations as designated by node B, method 300 re-enters the receive operations at block 342 from node D in FIG. 3A from step 364. Note that even though the entry and exit points are different in FIGS. 3A and 3B, the transmitter and receiver operating state steps are the same and thus are shown by the same numbering 351-364 for convenience.

Figure 4:
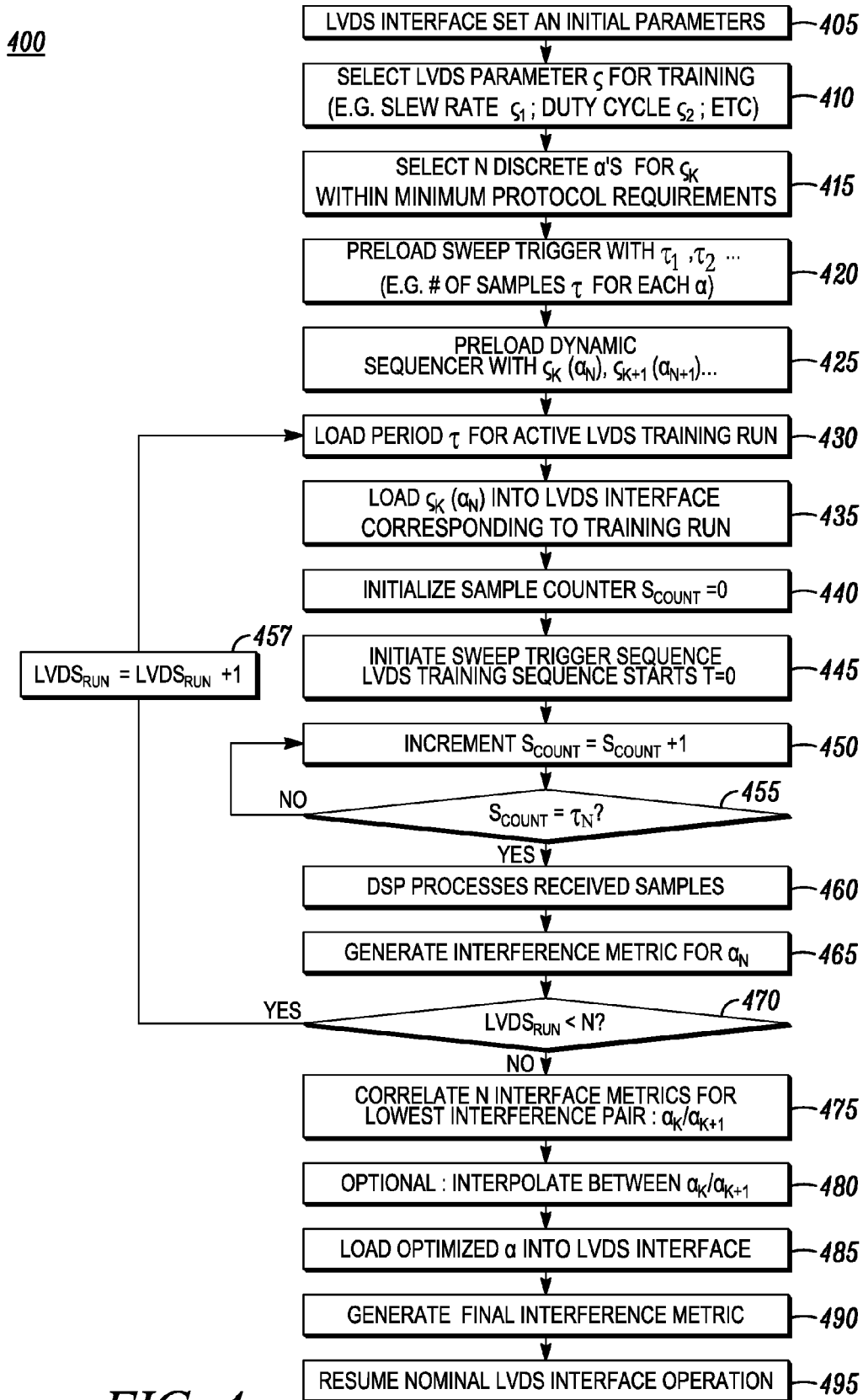
FIG. 4 depicts one embodiment of a flow chart of a method of operation for optimization of parameters for the adaptive transceiver interface depicted in FIG. 2.

FIG. 4 is a flowchart showing a method 400 used in operation by the adaptive transceiver interface 100 for generating a series of interference metrics for various values $\alpha$ of the selected parameter $\zeta_k$ to optimize operation of the adaptive transceiver interface 100, as discussed in step 351, through 357 above. Method 400 begins at step 405 which sets the adaptive transceiver interface 100 to operate using initial values $\alpha_i$ for various operating parameters $\zeta_k$ used for transmitting and receiving the protocol loaded in step 315 of FIG. 3. Next, at step 410, k number of parameters $\zeta_k$ are selected for optimization, where k is an integer equal to or greater than one. Then, at step 415, N discrete values $\alpha$ are selected for each parameter $\zeta_k$ selected for optimization, where N is an integer equal to or greater than one. The N discrete values are selected based on a number of factors, including sensitivity analysis and gradient scaling of parameter values from past training results, a priori prioritization of the value ranges, all of which must meet minimum protocol requirements for the digital signals at the interface being optimized.

Moving to step 420, a plurality of time periods $\tau_N$ delineating when digital signals are to be transmitted and received over receive interface 104 or transmit interface 107 are preloaded into sweep trigger 173. The individual time periods $\tau$ are associated with particular combinations of parameters $\zeta_k$ and discrete values $\alpha$. For example, if there are two parameters $\zeta_1$, $\zeta_2$, and each parameter $\zeta_1$, $\zeta_2$ has two values $\alpha$ selected, such as a nominal (NOM) value and an estimated (EST) "optimum" value, as shown in FIG. 5, then four possible combinations of discrete values $\alpha$ exist. Therefore, four training runs may be performed when optimizing parameters $\zeta_k$ within adaptive transceiver interface 100, and four periods of time $\tau$ may need to be determined, one for each training run. Each training run period $\tau$ may be equal to or different from each other depending on the requirements of the optimization sequence. After the sweep trigger 173 has been preloaded, the LVDS dynamic sequencer pair 174, 184 are preloaded with values for each unique combination of transmit-receive values $\zeta_k(\alpha_k)$, at step 425. Parameter $\zeta_k$ of step 425 designates the specific transmit-receive interface and parameter that is loaded with the correct value $\alpha_k$ used in a training run.

At step 430 a training period $\tau$ corresponding to the particular LVDS training run is activated at sweep trigger 173, where each iteration of an optimization sequence starts at time t equal to zero. At step 435, the value $\alpha_k$ for a targeted parameter $\zeta_k$ corresponding to the current training run is loaded into the appropriate LVDS interface from the dynamic sequencer pair 174, 184. After the value $\alpha_k$ has been loaded into the LVDS interface, the sample counter in the DSP 196 is initialized at step 440, so that the value of the sample count ($S_{count}$) is set to zero. In an alternative embodiment, the sample counter may be located within sweep trigger 173 whereby the current training period time t may be measured, where upon $\tau$ expires a new trigger pulse is generated to start a subsequent training run. For both embodiments, the sample counter measures time t relative to the number of transmit-receive samples that have been communicated over a particular adaptive transceiver interface 104 or 107 with respect to the sample rate. For example, if the symbol transmission across an adaptive transceiver interface 100 is twenty thousand samples-per-second (20 ksps), then a 5 millisecond (5 mS) iteration interval will correspond to $\tau$ equal to 100 samples. By the end of step 440, all LVDS parameter values $\alpha_k$ and associated timing interval $\tau_k$ that comprise a particular LVDS training run have been preloaded into the targeted transmit-receive pair and sweep trigger in preparation of measuring the interference metric for the values $\alpha_k$.

At step 445 the sweep trigger 173 generates a trigger pulse to start of the current LVDS training run. Step 445 corresponds to time T=0 of the current LVDS training run for parameter $\zeta_k$ having values $\alpha_k$ loaded into a transmit-receive pair of adaptive transceiver interface 100

Moving to step 450, the sample counter is incremented for each sample communicated across the LVDS interface that is being optimized. Decision step 455 determines whether or not the value of the sample count has reached the appropriated number samples N corresponding to $\tau$. If not, the method 400 proceeds from step 455 back to step 450, incrementing the sample count until the number of samples corresponding to period $\tau_k$ have been communicated. Once N samples corresponding to $\tau_k$ have been transmitted and received, the period of time $\tau$ has run out for the current LVDS training run, and the method moves from step 455 to step 460. Note that parallel processing of the received samples may be accomplished by DSP 196 while method 400 is iterating between steps 450 and 455. The parallel processing of the received samples by DSP 196 may be in support of normal communication functions of radio system 90 and may not otherwise be related to the LVDS training run; therefore the parallel processes of DSP 196 are not shown in FIG. 4.

At step 460, the DSP 196 processes all the received samples corresponding to $\tau_k$ and at step 465 generates an interference metric for the recently completed LVDS training run. At decision step 470, a determination is made as to whether all LVDS training runs included in a particular optimization sequence have been completed. If the training run index LVDS$_{RUN}$ is less than N, where N is the number of training runs included in the current optimization sequence, method 400 moves from step 470 to step 457, increases the value of LVDS$_{RUN}$ by one, and then moves to step 430 to commence loading the next series of timing intervals and parameter values $\alpha$.

In an alternative embodiment, DSP processing of the received samples from a previous LVDS training run designated as LVDS$_{RUN}$=L, where L is the training run index being processed at block 460 and 465, may proceed in parallel with the commencement of the next LVDS training run designated by LVDS$_{RUN}$=L+1. To support this alternative embodiment, processing of received samples by DSP 196 at steps 460 and 465 for LVDS$_{RUN}$=L is time shared with processing of the current received samples for normal radio functions and to facilitate parallel sequencing of the next LVDS training run at steps 430 through 455 for LVDS$_{RUN}$=L+1. If the training run index LVDS$_{RUN}$ for the current optimization sequence is not less than N, then method 400 moves from decision step 470 to step 475. Training run index LVDS$_{RUN}$ may correspond to the first column in Table 1, Table 2, and Table 3, labeled "LVDS training run."

At step 475, DSP 196 correlates the plurality of previously calculated interference metrics to the associated training values $\zeta_k(\alpha_N)$ to identify which combination of transmit-receive parameter values $\alpha_T$, $\alpha_R$ produce minimum interference. Some embodiments may include step 480 if more than one set of transmit-receive values $\alpha_T$, $\alpha_R$ produce interference levels at acceptable levels. In this case, to minimize the probability of setting a parameter value at the "edge" of an acceptable value range, the DSP 196 may interpolate between two values $\alpha_1$ and $\alpha_2$ employing any number of numerical interpolating techniques as is known in the art. Interpolating techniques may include, but is not limited to, linear averaging (e.g., $\{\alpha_1+\alpha_2\}/2$) or weighted scaling based on the amount of interference produced for each value (e.g., $[1-j]^* \alpha_1+\alpha_2^*j$, where j<1 and j becomes closer to zero the closer to the interference metric limit a given $\alpha$ produces).

Following step 475 and 480, method 400 proceeds to step 485 where the adaptive transceiver interface 100 is updated with the final, optimized transmit-receive parameter values $\alpha_{Tf}$, $\alpha_{Rf}$. After the final values have been updated into the LVDS interface, method 400 may perform one final transmit-receive communication over the interface and make one final interference measurement at step 490 so as to verify the recently completed optimization sequencing results. Following step 490, method 400 terminates by resuming normal LVDS interface operations. Step 495 of method 400 may correspond to step 330 or 335 of method 300.

Referring to Table 1, a full factorial combination table for optimization of two parameters $\zeta_k$ ($\zeta_1$, $\zeta_2$, where k=2) for adaptive transceiver interface 100 is depicted, in accordance with one embodiment. Each parameters $\zeta_k$ has two values $\alpha_N$ (where N=2, a nominal value NOM and an estimated "optimized" value EST). As a result, four possible combination of parameters $\zeta_k$ and discrete values $\alpha_N$ exist, and four training runs having four periods of time $\tau$ will be performed in optimizing parameters $\zeta_k$ for adaptive transceiver interface 100.

TABLE 1

| LVDS Training Run | LVDS Parameter Combination | Parameter $\zeta_1$ | Parameter $\zeta_2$ |
| --- | --- | --- | --- |
| 1 | Nominal | NOM$_{\zeta 1}$ | NOM$_{\zeta 2}$ |
| 2 | a | EST$_{\zeta 1}$ | NOM$_{\zeta 2}$ |
| 3 | b | NOM$_{\zeta 1}$ | EST$_{\zeta 2}$ |
| 4 | ab | EST$_{\zeta 1}$ | EST$_{\zeta 2}$ |

Referring to Table 2, a full factorial combination table for optimization of four parameters $\zeta_k$ ($\zeta_1$, $\zeta_2$, $\zeta_3$, $\zeta_4$, where k=4) for adaptive transceiver interface 100 is depicted, in accordance with one embodiment. Each parameters $\zeta_k$ has two values $\alpha_N$ (where N=2, a nominal value NOM and an estimated value EST). As a result, sixteen possible combination of parameters $\zeta_k$ and discrete values $\alpha_N$ exist, and sixteen training runs having sixteen periods of time $\tau$ will be performed in optimizing parameters $\zeta_k$ for adaptive transceiver interface 100.

TABLE 2

| LVDS Training Run | LVDS Parameter Combination | Parameter $\zeta_1$ | Parameter $\zeta_2$ | Parameter $\zeta_3$ | Parameter $\zeta_4$ |
|---|---|---|---|---|---|
| 1 | Nominal | $NOM_\zeta 1$ | $NOM_\zeta 2$ | $NOM_\zeta 3$ | $NOM_\zeta 4$ |
| 2 | a | $EST_\zeta 1$ | $NOM_\zeta 2$ | $NOM_\zeta 3$ | $NOM_\zeta 4$ |
| 3 | b | $NOM_\zeta 1$ | $EST_\zeta 2$ | $NOM_\zeta 3$ | $NOM_\zeta 4$ |
| 4 | ab | $EST_\zeta 1$ | $EST_\zeta 2$ | $NOM_\zeta 3$ | $NOM_\zeta 4$ |
| 5 | c | $NOM_\zeta 1$ | $NOM_\zeta 2$ | $EST_\zeta 3$ | $NOM_\zeta 4$ |
| 6 | ac | $EST_\zeta 1$ | $NOM_\zeta 2$ | $EST_\zeta 3$ | $NOM_\zeta 4$ |
| 7 | bc | $NOM_\zeta 1$ | $EST_\zeta 2$ | $EST_\zeta 3$ | $NOM_\zeta 4$ |
| 8 | abc | $EST_\zeta 1$ | $EST_\zeta 2$ | $EST_\zeta 3$ | $NOM_\zeta 4$ |
| 9 | d | $NOM_\zeta 1$ | $NOM_\zeta 2$ | $NOM_\zeta 3$ | $EST_\zeta 4$ |
| 10 | ad | $EST_\zeta 1$ | $NOM_\zeta 2$ | $NOM_\zeta 3$ | $EST_\zeta 4$ |
| 11 | bd | $NOM_\zeta 1$ | $EST_\zeta 2$ | $NOM_\zeta 3$ | $EST_\zeta 4$ |
| 12 | abd | $EST_\zeta 1$ | $EST_\zeta 2$ | $NOM_\zeta 3$ | $EST_\zeta 4$ |
| 13 | cd | $NOM_\zeta 1$ | $NOM_\zeta 2$ | $EST_\zeta 3$ | $EST_\zeta 4$ |
| 14 | acd | $EST_\zeta 1$ | $NOM_\zeta 2$ | $EST_\zeta 3$ | $EST_\zeta 4$ |
| 15 | bcd | $NOM_\zeta 1$ | $EST_\zeta 2$ | $EST_\zeta 3$ | $EST_\zeta 4$ |
| 16 | abcd | $EST_\zeta 1$ | $EST_\zeta 2$ | $EST_\zeta 3$ | $EST_\zeta 4$ |

When simultaneously optimizing k different LVDS interface parameters $\zeta_k$, each parameter $\zeta_k$ having M values then the number of LVDS training run corresponding to a full factorial sequence will be $M^k$ runs.

Referring to Table 3, a full factorial combination table for optimization of two parameters $\zeta_k$ ($\zeta_1$, $\zeta_2$, where k=2) each having three possible values $\alpha_N$ (where M=3 corresponding to a first value A, a second value B, and a third value C) for adaptive transceiver interface 100. As a result, nine possible combination of parameters $\zeta_k$ and discrete values $\alpha_N$ exist, and nine training runs having nine periods of time $\tau$ will be performed in optimizing parameters $\zeta_k$ for adaptive transceiver interface 100.

TABLE 3

| LVDS Training Run | LVDS Parameter Combination | Parameter $\zeta_1$ | Parameter $\zeta_2$ |
|---|---|---|---|
| 1 | Nominal | $A_\zeta 1$ | $A_\zeta 2$ |
| 2 | ab | $A_\zeta 1$ | $B_\zeta 2$ |
| 3 | ac | $A_\zeta 1$ | $C_\zeta 2$ |
| 4 | ba | $B_\zeta 1$ | $A_\zeta 2$ |
| 5 | bb | $B_\zeta 1$ | $B_\zeta 2$ |
| 6 | bc | $B_\zeta 1$ | $C_\zeta 2$ |
| 7 | ca | $C_\zeta 1$ | $A_\zeta 2$ |
| 8 | cb | $C_\zeta 1$ | $B_\zeta 2$ |
| 9 | cc | $C_\zeta 1$ | $C_\zeta 2$ |

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

While various embodiments of the invention have been described, it will be apparent to those of ordinary skill in the art that other embodiments and implementations are possible within the scope of the invention. Accordingly, the invention is not to be restricted except in light of the attached claims and their equivalents.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

The invention claimed is:

1. A method for minimizing intra-device interference between a radio-frequency (RF) wireless modem and a first digital wired communication link linking a first transmitter and first receiver, the method comprising:

configuring a dynamic sequencer to adjust at least one of a plurality of transmit parameters $\zeta_T$ and receive parameters $\zeta_R$ for controlling responses from the first transmitter and the first receiver pair having the first digital wired communication link therebetween;

triggering a tandem iteration of the transmit and receive parameters $\zeta_T$ and $\zeta_R$ over a second digital wired communication link via a dynamic sequencer that synchronously provides updated parameter values to the first transmitter and first receiver in response to a dynamic sequencer sweep trigger signal;

communicating first and second signals over the first digital wired communication link, the first and second signals having a transmit parameter $\zeta_T$ respectively set by the dynamic sequencer to a first and second transmission value $\alpha_{t1}$, $\alpha_{t2}$ and having a receive parameter $\zeta_R$ respectively set by the dynamic sequencer to a first and second reception value $\alpha_{r1}$, $\alpha_{r2}$;

generating a first and second interference metric for the first and second signal respectively and associating the first and second interference metric with the first and second transmission and reception values $\alpha_{t1}$ and $\alpha_{r1}$ and $\alpha_{t2}$ and $\alpha_{r2}$;

correlating the first and second interference metrics to generate a final transmit parameter value $\alpha_{tf}$ for the transmit parameter $\zeta_T$ and a final parameter $\alpha_{rf}$ for the receive parameter $\zeta_R$ that minimize interference at one or both of the RF wireless modem and the first digital wired communication link; and setting at least one of the transmit or receive parameters $\zeta_T$ or $\zeta_R$ of at least one of the first or second signals to the corresponding final transmit parameter value $\alpha_{tf}$ for transmit parameter $\zeta_T$ and final receive parameter $\alpha_{rf}$ for receive parameter $\zeta_R$.

2. The method of claim 1, further comprising determining which transmit parameters $\zeta_T$ and receive parameters $\zeta_R$ are selected for tandem iteration by the dynamic sequencer based on the magnitude of change in interference metrics during previous optimizations of the first digital wired communication link or the type of interference detected.

3. The method of claim 1, wherein the first digital wired communication link is a low voltage differential signaling (LVDS) interface.

4. The method of claim 3, further comprising:
transmitting a third signal over the LVDS interface having a parameter $\zeta_k$ set by the dynamic sequencer to a third value $\alpha_3$;
receiving the third signal over the LVDS interface and generating a third interference metric for the third signal;
correlating the first, second and third interference metrics to generate a final parameter value $\alpha_f$; and
setting the parameter $\zeta_k$ to the final parameter value $\alpha_f$ if it minimizes interference at one or both of the RF wireless modem and the first digital wired communication link.

5. The method of claim 4, wherein a power spectrum density (PSD) analysis algorithm generates the first and second interference metrics for determining the level of spurious response.

6. The method of claim 5, wherein the setting of the parameter $\zeta_k$ to the final parameter value $\alpha_f$ either minimizes a self-quieting spurious response or an off-channel spurious responses or maximizes the LVDS signal fidelity.

7. An apparatus configured to minimize intra-apparatus interference, the apparatus comprising:
a radio-frequency (RF) wireless modem;
a first digital wired communication link physically linking a first transmitter and a first receiver;
the first transmitter configured to transmit signals across the first digital wired communication link, wherein the first transmitter is able to adjust to a variety of transmit parameters $\zeta_T$ to support various protocol requirements when transmitting the signals, each transmit parameter $\zeta_T$ able to assume one of a plurality of transmit values $\alpha_t$;
the first receiver configured to receive the transmitted signals over the first digital wired communication link, wherein the first receiver is able to adjust to a variety of receive parameters $\zeta_R$ to support various protocol requirements when receiving the transmitted signals, each receive parameter $\zeta_R$ able to assume one of a plurality of receive values $\alpha_r$, the first transmitter and first receiver configured to form an adaptive wired communication link;
a dynamic sequencer configured to iteratively adjust the transmit and receive parameters $\zeta_T$ and $\zeta_R$ synchronously, the transmit values $\alpha_t$ for the transmit parameter $\zeta_T$ and receive values $\alpha_r$ for the receive parameter $\zeta_R$ independently set by the dynamic sequencer, each of a plurality of signals transmitted and received over the first digital wired communication link having at least one of the parameters $\zeta$ set by the dynamic sequencer to one of a plurality of the values $\alpha$;
a second digital wired communication link configured to communicate one of a dynamic sequencer sweep trigger signals and updated parameter values themselves to synchronously adjust the transmit and receive parameters $\zeta_T$ and $\zeta_R$; and
an analyzer, coupled to the first transmitter and the first receiver, and configured to (i) generate a plurality of interference metrics, one interference metric generated for each particular combination of transmit and receive parameters $\zeta_T$ and $\zeta_R$ having transmit and receive values $\alpha_t$ and $\alpha_r$ for the signals being transmitted and received and (ii) determine, from the plurality of interference metrics, final transmit and receive parameter values $\alpha_f$ that minimize interference at one or both of the RF wireless modem and the first digital wired communication link.

8. The apparatus of claim 7, wherein the wired communication link is a low voltage differential signaling (LVDS) interface.

9. The apparatus of claim 8, wherein the LVDS interface communicates sampled signals from an RF receiver portion of the RF wireless modem to a processing apparatus.

10. The apparatus of claim 9, wherein a second LVDS interface over a third paired digital wired communication link communicates digital signals for modulating at an RF transmitter portion of the RF wireless modem from the processing apparatus.

11. The apparatus of claim 7, wherein the dynamic sequencer sweep trigger signal control a period of time $\tau$ for which the first transmitter is to transmit, and the first receiver is to receive, the transmitted signals.

12. The apparatus of claim 7, wherein the interference metrics comprise at least one of a signal-to-noise (SNR) ratio of the transmitted signals, a bit-error-rate (BER) of the transmitted signals, the signal quality estimate (SQE) of the transmitted signals, the power spectral density (PSD) threshold of the transmitted signals, or a quality of service (QoS) of the transmitted signals.

13. A method for minimizing undesired signal coupling between a low noise communication stage at a radio-frequency (RF) transceiver circuit including an RF wireless modem and a digital processing stage circuit connected to the RF transceiver circuit via a first digital wired communications interface, the method comprising:

transmitting, via a transmitter coupled to the first digital wired communication interface, first and second signals over the first digital wired communications interface, the first and second signals each having a parameter $\zeta_k$, the parameter $\zeta_k$ of the first and second signal set by a dynamic sequencer to a first value $\alpha_1$ and second value $\alpha_2$, respectively;

receiving, via a receiver coupled to the first digital wired communication interface, the first and second signal over the communications interface at an analyzer and generating a first and second interference metric for the first and second signal, respectively;

correlating the first and second interference metrics to generate a final parameter value $\alpha_f$ that minimize interference at one or both of the RF wireless modem and the first digital wired communication link; and configuring the transmitter to transmit a third signal over the first digital wired communications interface, the third signal having a parameter $\zeta_k$ set to the final parameter value $\alpha_f$.

14. The method of claim 13, wherein the adjustment of the parameter $\zeta_k$ of the third signal is triggered when the first digital wired communication interface signal fidelity degrades below a predefined threshold.

15. The method of claim 14, where-in the communication interface signal fidelity of a particular signal is measured by a signal-to-noise (SNR) ratio of the first and second signals, a bit-error-rate (BER) of the first and second signals, a signal quality error of the first and second signals, a power spectral density (PSD) threshold of the first and second signals, or a quality of service (QoS) of the first and second signals.

16. The method of claim 13, wherein the first digital wired communications interface is a low voltage differential signaling (LVDS) interface.

17. The method of claim 13, further comprising configuring the dynamic sequencer to adjust at least one of a plurality of parameters $\zeta k$ of signals transmitted via the first digital wired communications interface, the dynamic sequencer synchronized to an operating state of a concurrent system.

18. The method of claim 13 further comprising activating a sweep trigger configured to control the dynamic sequencer.

19. The apparatus of claim 7, wherein the wired communication link is one of a universal serial bus (USB), RS-422, RS-485, Ethernet, PCI Express, IEEE-488, and Serial Port Interface (SPI) interface.

20. The apparatus of claim 7, wherein the first transmitter is disposed in a transceiver IC along with the RF wireless modem, and the first receiver is disposed in a separate digital controller IC along with the analyzer, the wired communication link coupling the transceiver IC with the digital controller IC within the apparatus.

21. The apparatus of claim 7, wherein the adjusted transmit parameter $\zeta_T$ is one of slew rate, sample rate, clock rate, duty cycle, differential phase offset, common mode voltage offset, termination impedance, current or voltage mode operation, and differential or single-ended amplitude levels.

\* \* \* \* \*